(12) United States Patent
Scherpenberg et al.

(10) Patent No.: US 9,331,466 B2
(45) Date of Patent: May 3, 2016

(54) PROTECTIVE DEVICES FOR ELECTRIC POWER ADAPTERS/CHARGERS

(71) Applicants: Scott Scherpenberg, Columbus, OH (US); Lucas Williamson, Columbus, OH (US); Andrew Lien, Lima, OH (US)

(72) Inventors: Scott Scherpenberg, Columbus, OH (US); Lucas Williamson, Columbus, OH (US); Andrew Lien, Lima, OH (US)

(73) Assignee: Juiceboxx Inc., Columbus, OH (US)

( * ) Notice: Subject to any disclaimer, the term of this patent is extended or adjusted under 35 U.S.C. 154(b) by 0 days.

(21) Appl. No.: 14/564,429

(22) Filed: Dec. 9, 2014

(65) Prior Publication Data

US 2015/0288154 A1    Oct. 8, 2015

Related U.S. Application Data

(63) Continuation-in-part of application No. 29/487,191, filed on Apr. 7, 2014.

(51) Int. Cl.
*H02G 3/08* (2006.01)
*H02G 11/02* (2006.01)

(52) U.S. Cl.
CPC ..................................... *H02G 11/02* (2013.01)

(58) Field of Classification Search
USPC ............................................................ 174/50
See application file for complete search history.

(56) References Cited

U.S. PATENT DOCUMENTS

| | | | | |
|---|---|---|---|---|
| 5,756,935 A * | 5/1998 | Balanovsky | ........... | H01R 24/46 174/549 |
| 6,184,461 B1 * | 2/2001 | Flegel | .................... | H01R 13/72 174/135 |

* cited by examiner

*Primary Examiner* — Dhirubhai R Patel
(74) *Attorney, Agent, or Firm* — Porter, Wright, Morris & Arthur, LLP

(57) ABSTRACT

A protective device for an electric power adapter/charger includes a trumpet-shaped support member having an inner passage along a longitudinal axis for receiving and supporting a cable of the adapter/charger to prevent bending the cable at sharp angles and an enclosure for enclosing at least a portion of the support member and at least a portion of a body of the adapter/charger to secure the support member to the adapter/charger. The support member includes first and second portions connectable about a parting plane containing the longitudinal axis so that the support member can be laterally connected about the cable. The enclosure includes first and second portions connectable about a parting plane containing the longitudinal axis so that the enclosure can be secured about the body of the adapter/charger and clamping the first and second portions of the support member together.

20 Claims, 21 Drawing Sheets

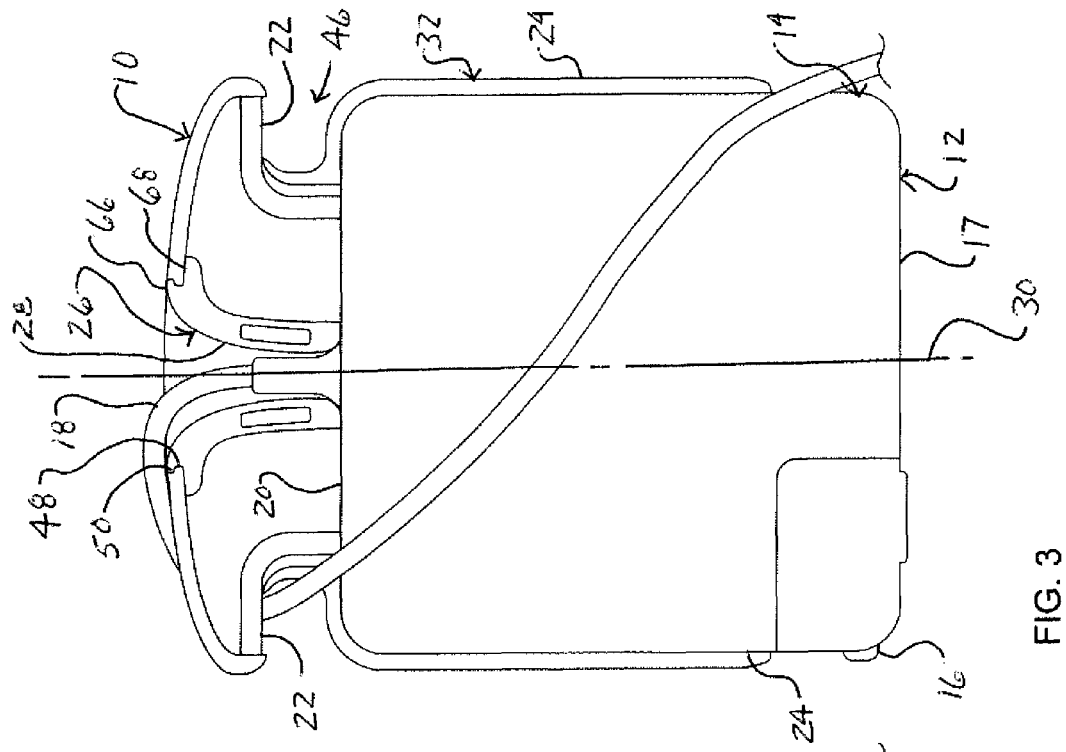
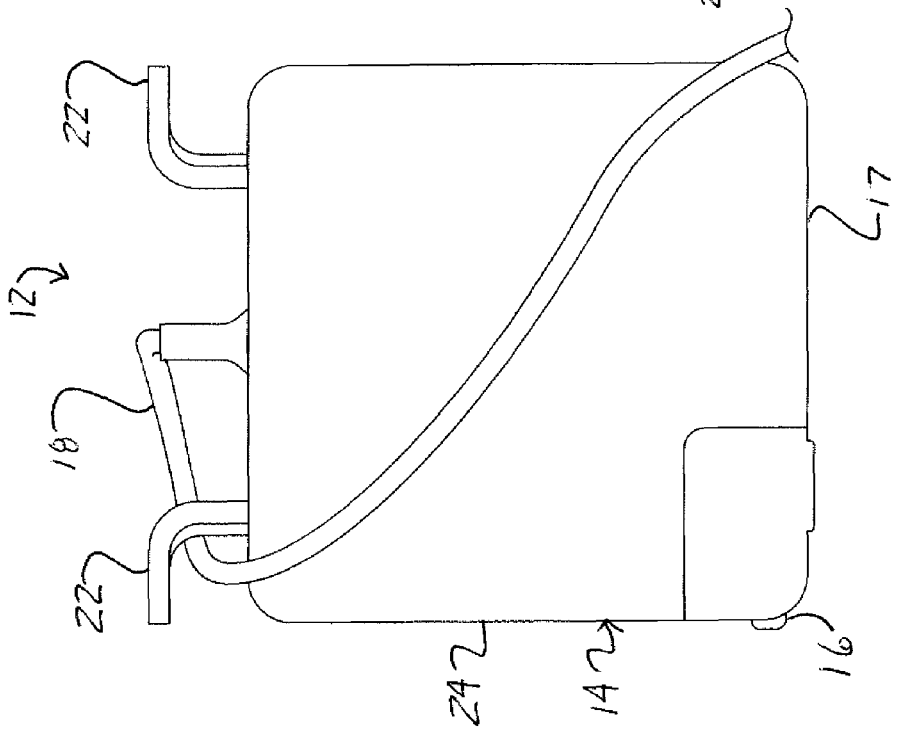

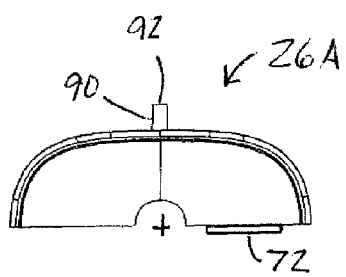
FIG. 18
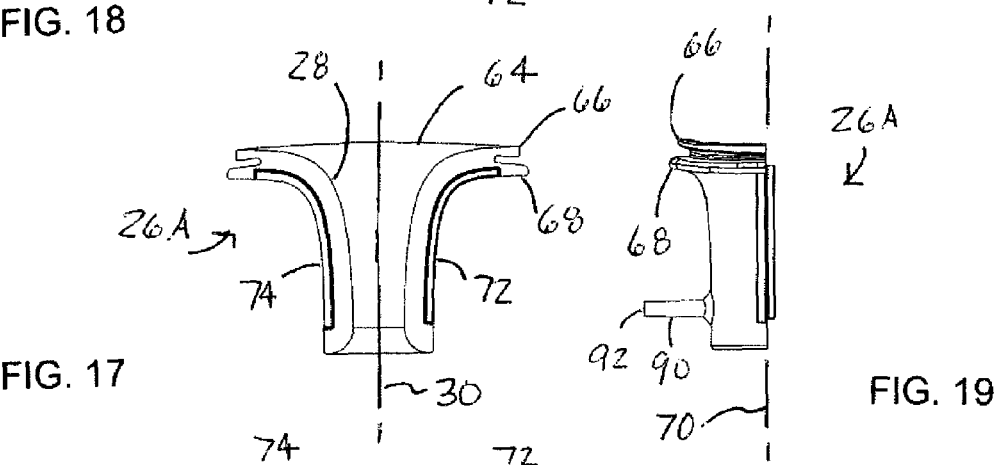
FIG. 17
FIG. 19
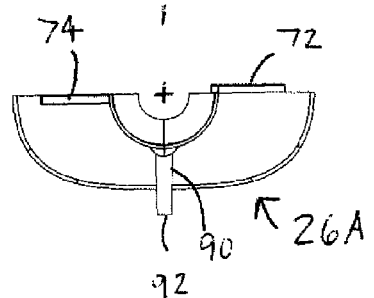
FIG. 16

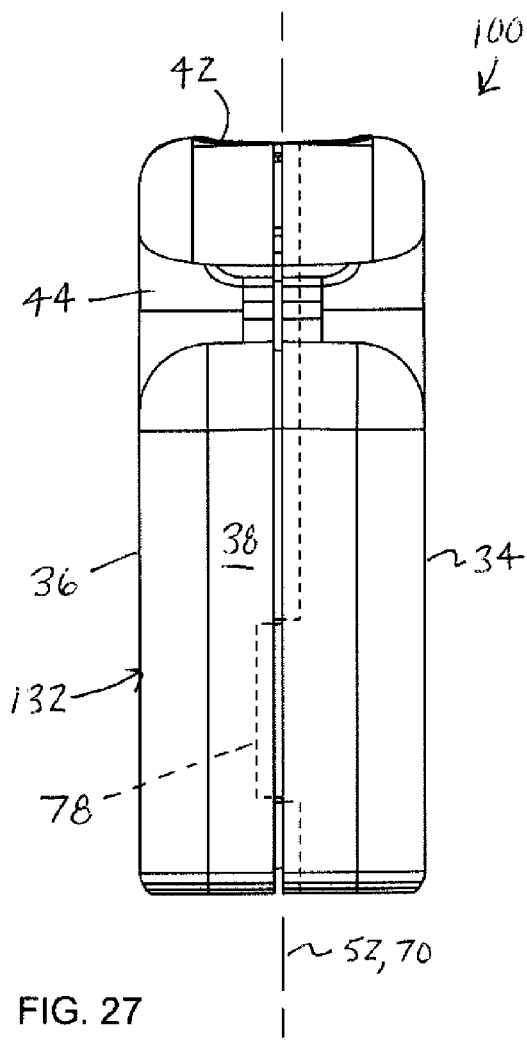
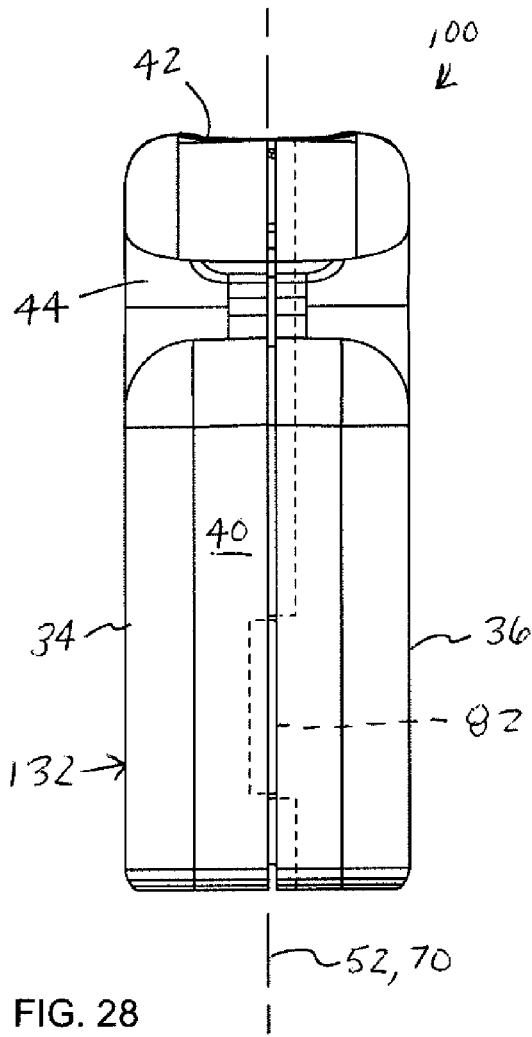
FIG. 27
FIG. 28
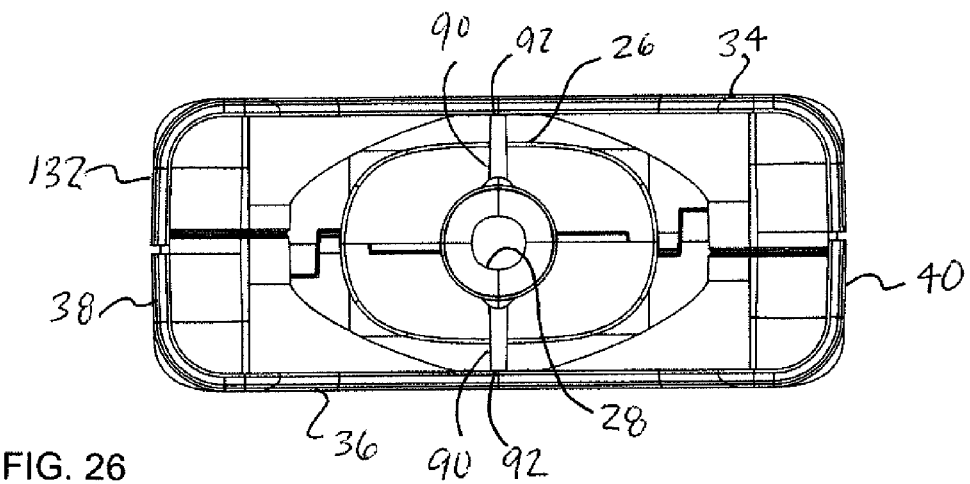
FIG. 26

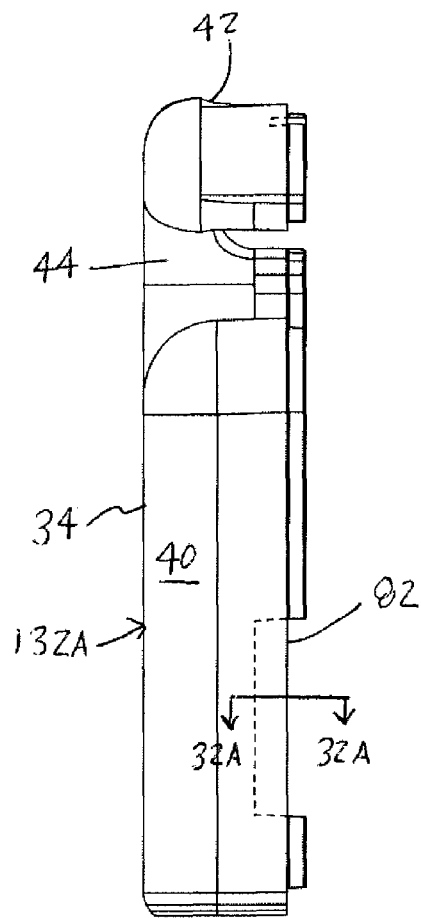
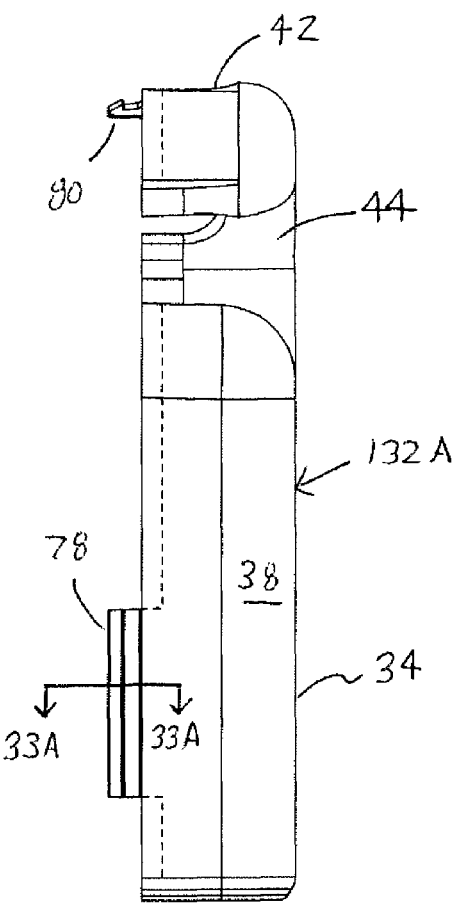
FIG. 32　　　　　　　　　FIG. 33
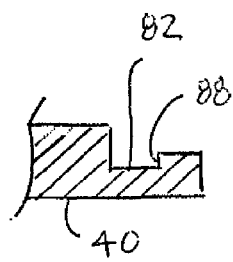
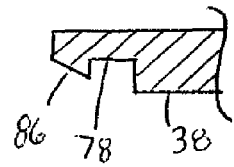
FIG. 32A　　　　　　　　FIG. 33A

PROTECTIVE DEVICES FOR ELECTRIC POWER ADAPTERS/CHARGERS

CROSS-REFERENCE TO RELATED APPLICATIONS

This application is a continuation-in-part (CIP) of U.S. patent application Ser. No. 29/487,191 filed on Apr. 7, 2014, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to electric power adapters or chargers for portable electronic devices and, more particularly, to devices for protecting cables of such electric power adapters or chargers.

BACKGROUND OF THE INVENTION

The use of portable electronic devices in our daily lives has proliferated rapidly. It is not unusual for a person to use laptop computers, tablet computers, smart phones, and the like to continuously remain in contact with business associates, friends, family and others. The portable electronic devices are typically powered by rechargeable batteries. As a result, there is an almost continuous need to power and/or recharge these portable electronic devices. These portable electronic devices are typically sold along with an electric power adapter or charger. These electric power adapters or chargers are plugged into the portable electronic devices and also into mains electricity, which is the general-purpose alternating-current (AC) electric power supply, via a typical "wall outlet" in order to connect the rechargeable battery to the mains electricity. These electric power adapters or chargers convert the AC electric power into direct current (DC) electric power so that the rechargeable batteries are recharged and/or the portable electric devices can be operated via the mains electricity.

While these electric power adapters or chargers are typically effective at recharging and/or powering the portable electric devices, repeated bending of the electric cables can cause fraying or other damage to the electric cables. This is particularly a problem when the electric cables are repeatedly bent at sharp or other damaging angles. For example, the 85 W MagSafe power adapter intended for use with a 15 inch or a 17 inch MacBook Pro is available from Apple Inc., of Cupertino Calif. The 85 W MagSafe power adapter has an electric cable for connection to the portable electronic device that extends from the top of a body or "power brick" and a pair of retractable arms or wings that selectively extend from the body. When extended, the wings form a cable wrap about the location in which the electric cable exits the body so that the electric cable can be wrapped about the body for storage and/or travel when the electric power adapter or charger is not is use. However, the electric cable can be bent at a sharp, damaging angle (best seen in FIG. 3) when wrapped about the cable wrap in an improper manner which can result fraying or other damage the electric cable if done repeatedly. While electric power adapters or chargers can be replaced with replacements available from both OEMs and other third party providers, the replacements are relatively expensive.

Accordingly, there is a need for a protective device for cables of electric power adapters or chargers for portable electronic devices and the like.

SUMMARY OF THE INVENTION

Disclosed are cable protective devices for electric power adapters or chargers which address one or more issues of the related art. Disclosed is a protective device for an electric power adapter having a body and a cable extending from the body. The protective device comprises, in combination, a trumpet-shaped support member having an inner passage therethrough along a longitudinal axis and configured to receive the cable of the electric power adapter within the inner passage with the first end of the inner passage facing the body of the electric power adapter to support the cable of the electric power adapter adjacent the body of the electric power adapter, and an attachment member secured to the trumpet-shaped support member and configured to be removably secured to the body of the electric power adapter. The inner passage has a first end and a second end larger than the first end.

Also disclosed is a protective device for an electric power adapter having a body and a cable extending from the body. The protective device comprises, in combination, a support member having an inner passage therethrough along a longitudinal axis and is formed by first and second portions selectively connectable and separable about a parting plane containing the longitudinal axis so that the support member can be laterally connected and separated about the cable of the electric power adapter and an attachment member secured to the support member and configured to be removably secured to the body of the electric power adapter. The inner passage has a first end and a second end larger than the first end. The support member is configured to receive the cable of the electric power adapter within the inner passage with the first end of the inner passage facing the body of the electric power adapter to support the cable of the electric power adapter adjacent the body of the electric power adapter.

Also disclosed is a protective device for an electric power adapter having a body and a cable extending from the body. The protective device comprises, in combination, a support member having an inner passage therethrough along a longitudinal axis and configured to receive the cable of the electric power adapter within the inner passage with the first end of the inner passage facing the body of the electric power adapter to support the cable of the electric power adapter adjacent the body of the electric power adapter, and an enclosure configured to enclose at least a portion of the support member and at least a portion of the body of the electronic power adapter to secure to the support member to the body of the electric power adapter. The inner passage has a first end and a second end larger than the first end. The enclosure includes first and second portions selectively connectable and separable to selectively clamp the support member therebetween to secure the first and second portions of the support member together.

From the foregoing disclosure and the following more detailed description of various preferred embodiments it will be apparent to those skilled in the art that the present invention provides a significant advance in the technology and art of electric power adapters or chargers. Particularly significant in this regard is the potential the invention affords for providing easy to use and relatively inexpensive protective devices for cables of electric power adapters or chargers. Additional features and advantages of various preferred embodiments will be better understood in view of the detailed description provided below.

BRIEF DESCRIPTION OF THE DRAWINGS

These and further features of the present invention will be apparent with reference to the following description and drawings.

FIG. 2 is front elevational view of the protective device and the electric power adapter or charger of FIG. 1 with a front portion of the protective device removed for clarity.

FIG. 3 is front elevational view of the electric power adapter or charger of FIGS. 1 and 2 with the protective device removed.

FIG. 16 is a bottom plan view of a first or front portion of a support member of the protective device of FIGS. 4 to 10, wherein a second or rear portion of the support member is identical.

FIG. 17 is a rear elevational view of the first portion of the support member of FIG. 16.

FIG. 18 is a top plan view of the first portion of the support member of FIGS. 16 and 17.

FIG. 19 is a right side elevational view of the first portion of the support member of FIGS. 16 to 18.

FIG. 26 is a bottom plan view of the protective device of FIGS. 22 to 25.

FIG. 27 is a right side elevational view of the protective device of FIGS. 22 to 26.

FIG. 28 is a left side elevational view of the protective device of FIGS. 22 to 27.

FIG. 32 is a left side elevational view of the first portion of the attachment member of FIGS. 29 to 31.

FIG. 32A is an enlarged cross-sectional view taken along line 32A-32A of FIG. 32.

FIG. 33 is a right side elevational view of the first portion of the attachment member of FIGS. 29 to 32.

FIG. 33A is an enlarged cross-sectional view taken along line 33A-33A of FIG. 33.

Figure 1:
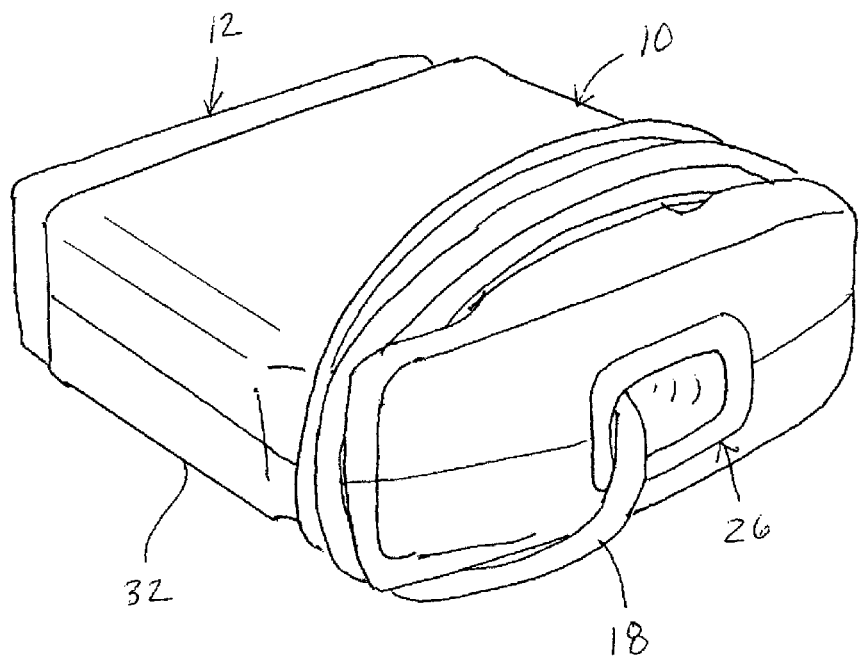
FIG. 1 is a perspective view of a protective device installed onto an electric power adapter or charger according to a first embodiment of the present invention.
Figure 4:
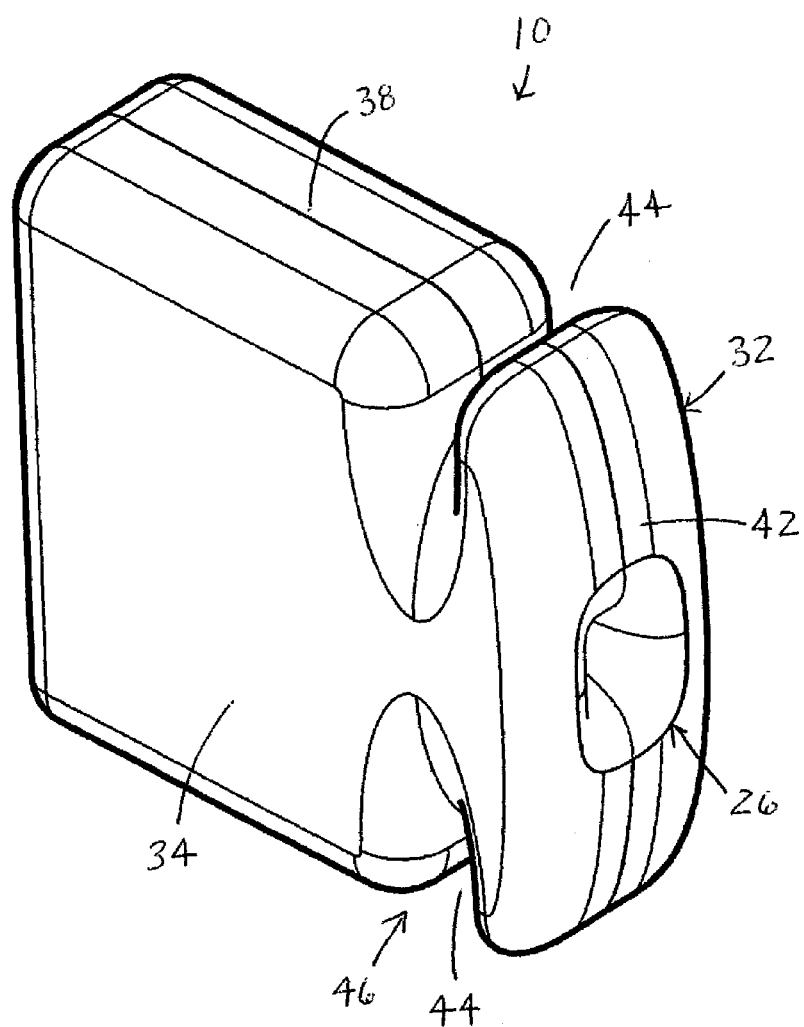
FIG. 4 is a top-front perspective view of the protective device of FIGS. 1 and 2 with the electric power adapter or charger removed.
Figure 5:
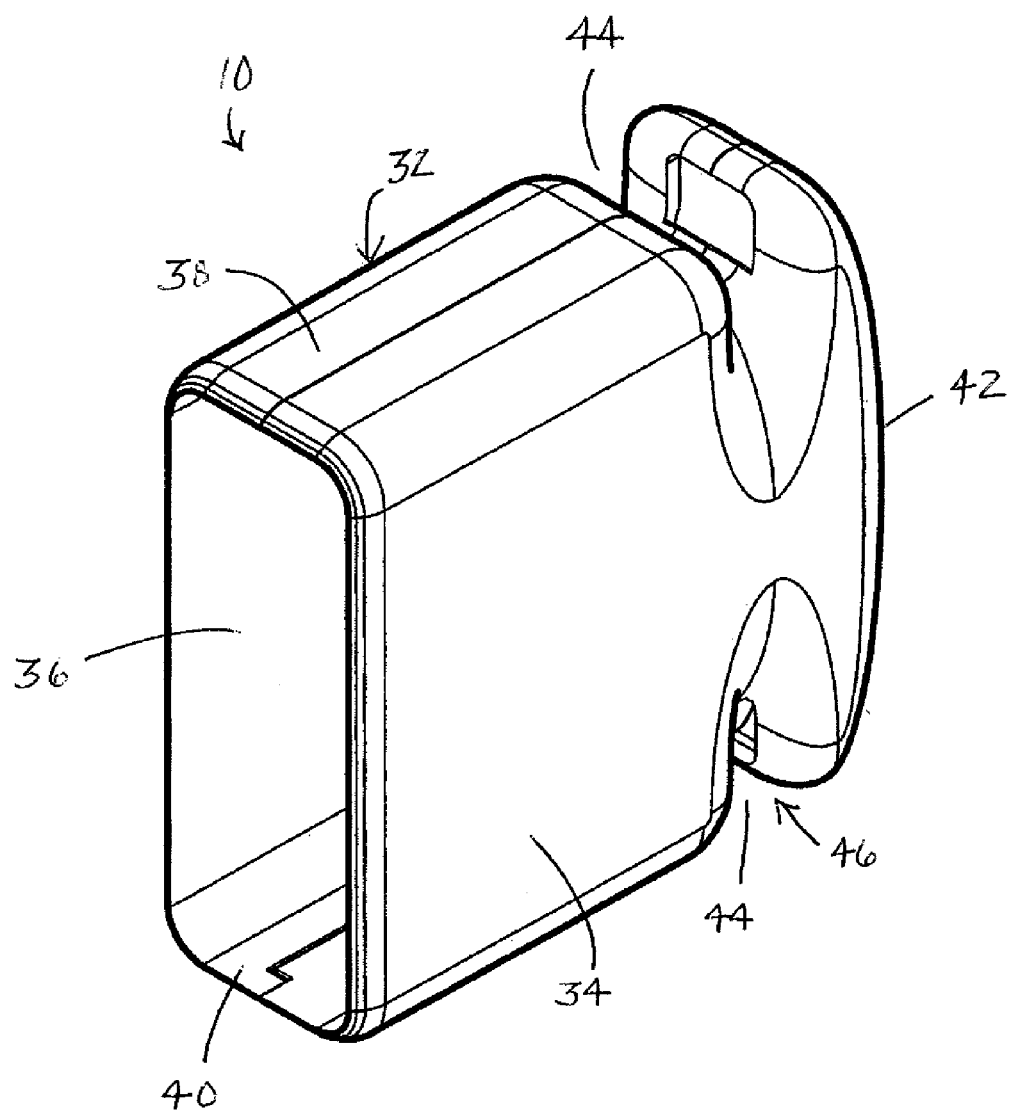
FIG. 5 is a bottom-front perspective view of the protective device of FIG. 4.
Figure 7:
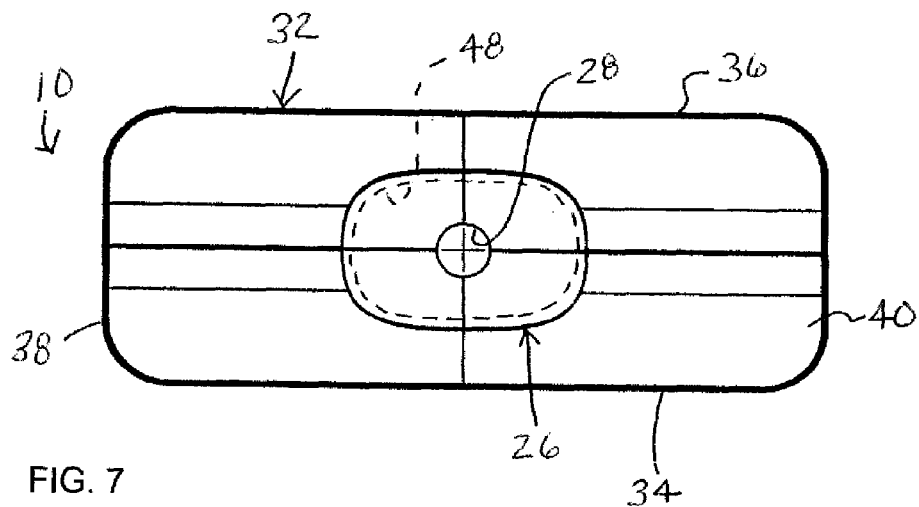
FIG. 7 is a top plan view of the protective device of FIGS. 4 to 6.
Figure 6:
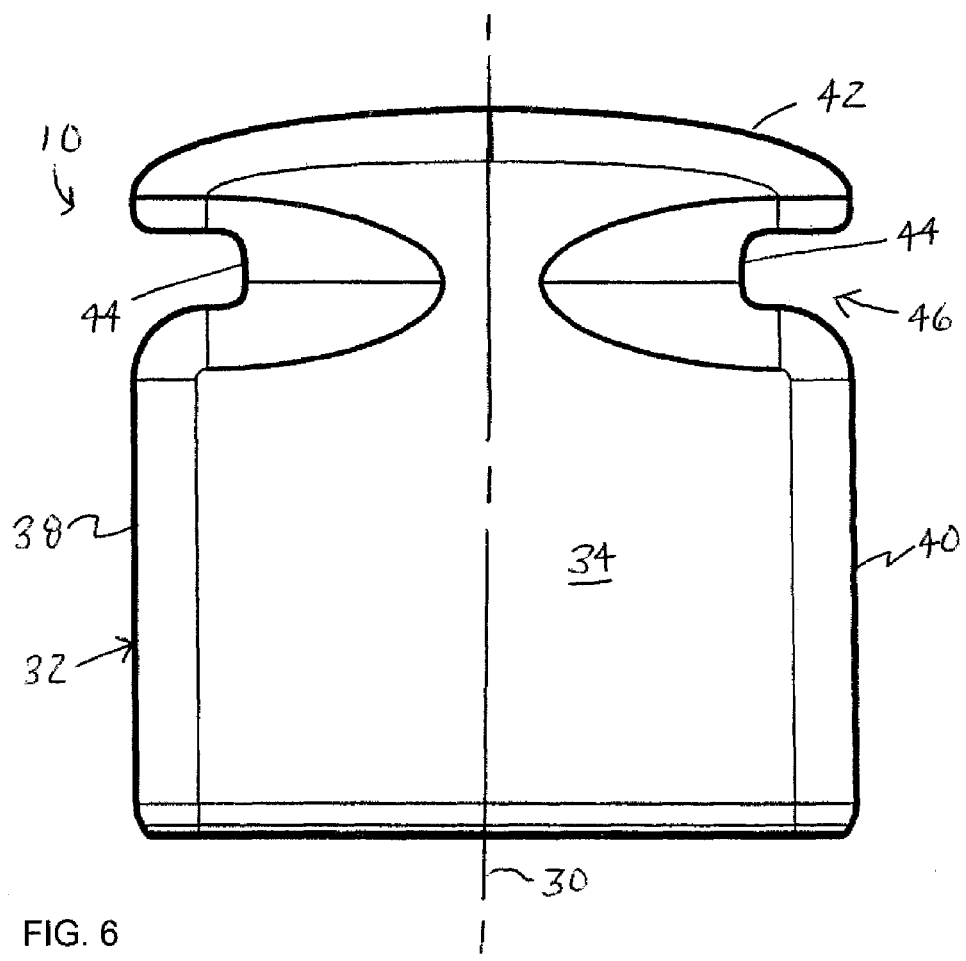
FIG. 6 is a front elevational view of the protective device of FIGS. 4 and 5.
Figure 9:
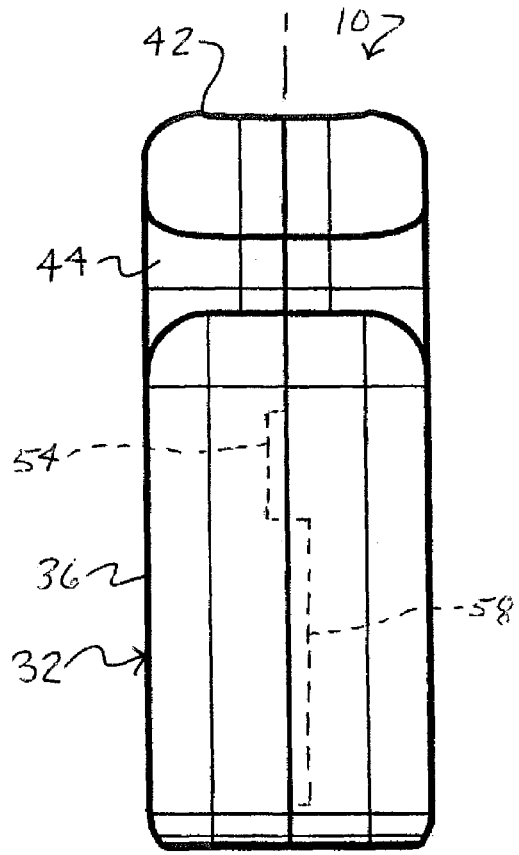
FIG. 9 is a right side elevational view of the protective device of FIGS. 4 to 8.
Figure 10:
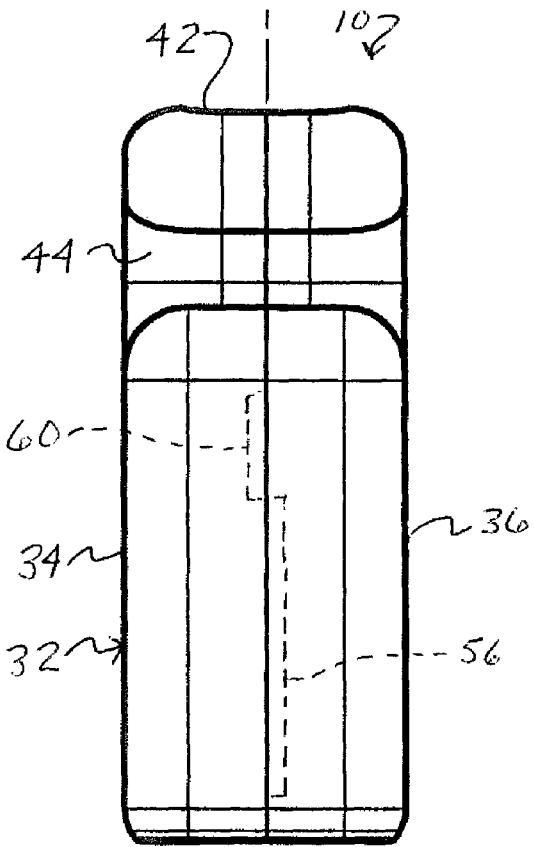
FIG. 10 is a left side elevational view of the protective device of FIGS. 4 to 9.
Figure 8:
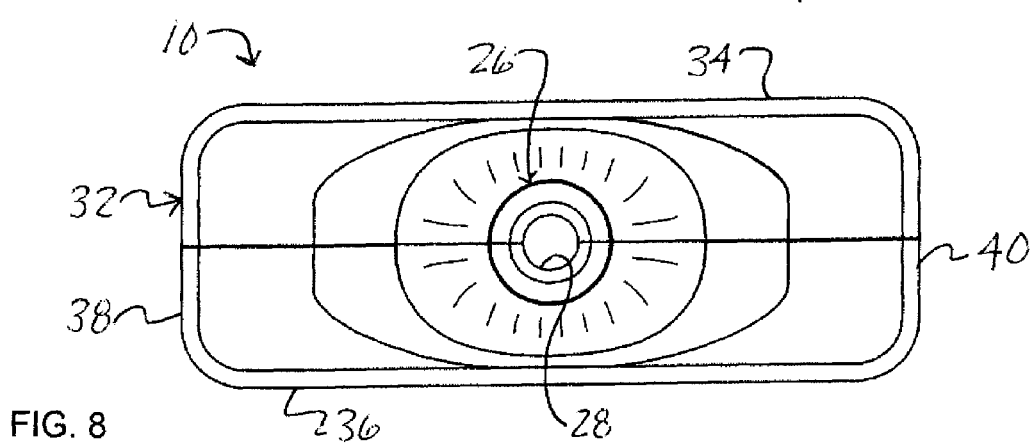
FIG. 8 is a bottom plan view of the protective device of FIGS. 4 to 7.
Figure 11:
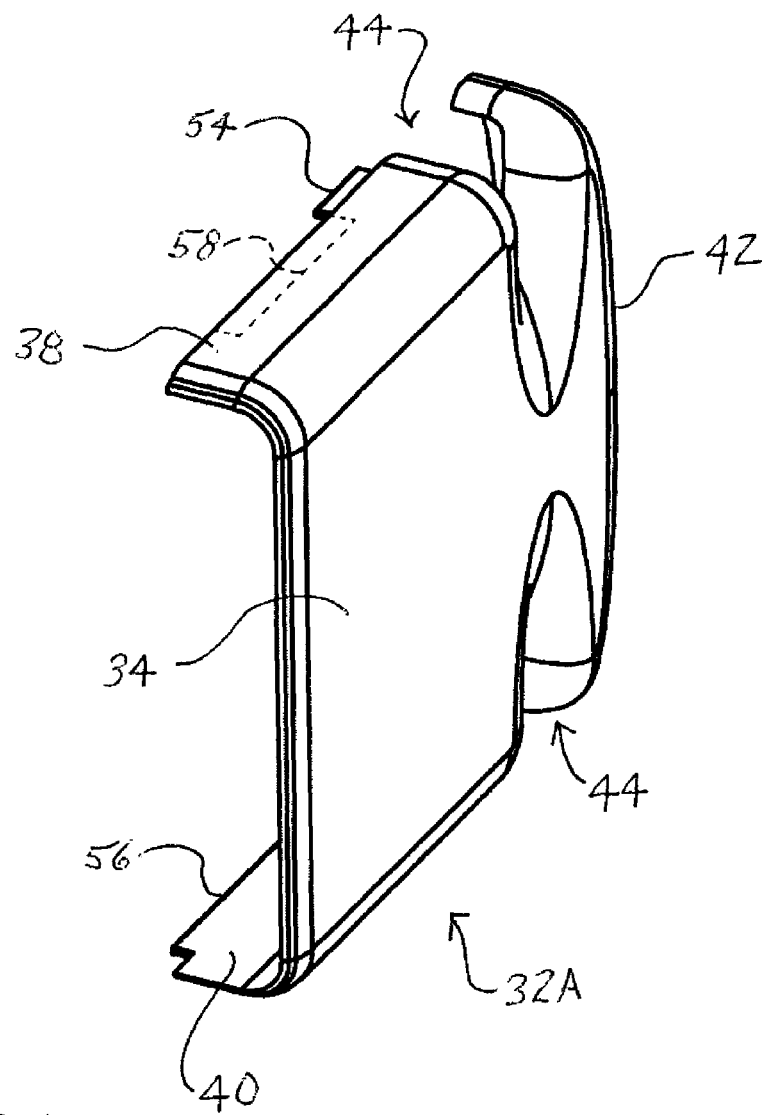
FIG. 11 is a bottom-front perspective view of a first or front portion of an attachment member of the protective device of FIGS. 4 to 10, wherein a second or rear portion of the attachment member is identical.
Figure 13:
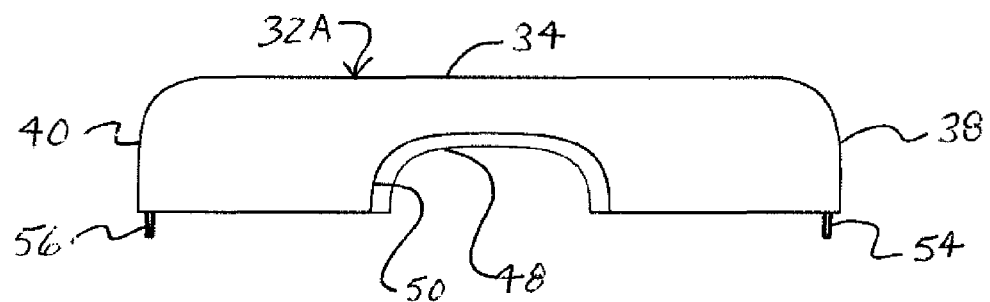
FIG. 13 is a top plan view of the first portion of the attachment member of FIGS. 11 and 12.
Figure 12:
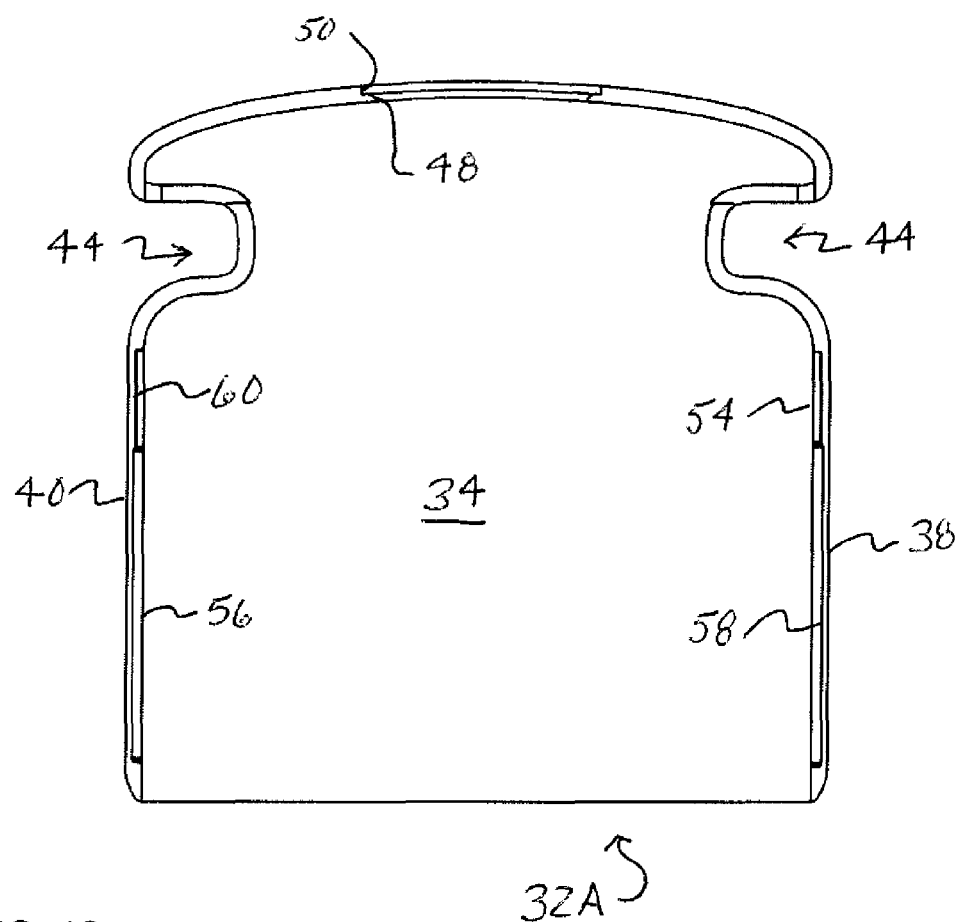
FIG. 12 is a rear elevational view of the first portion of the attachment member of FIG. 11.
Figures 14, 15:
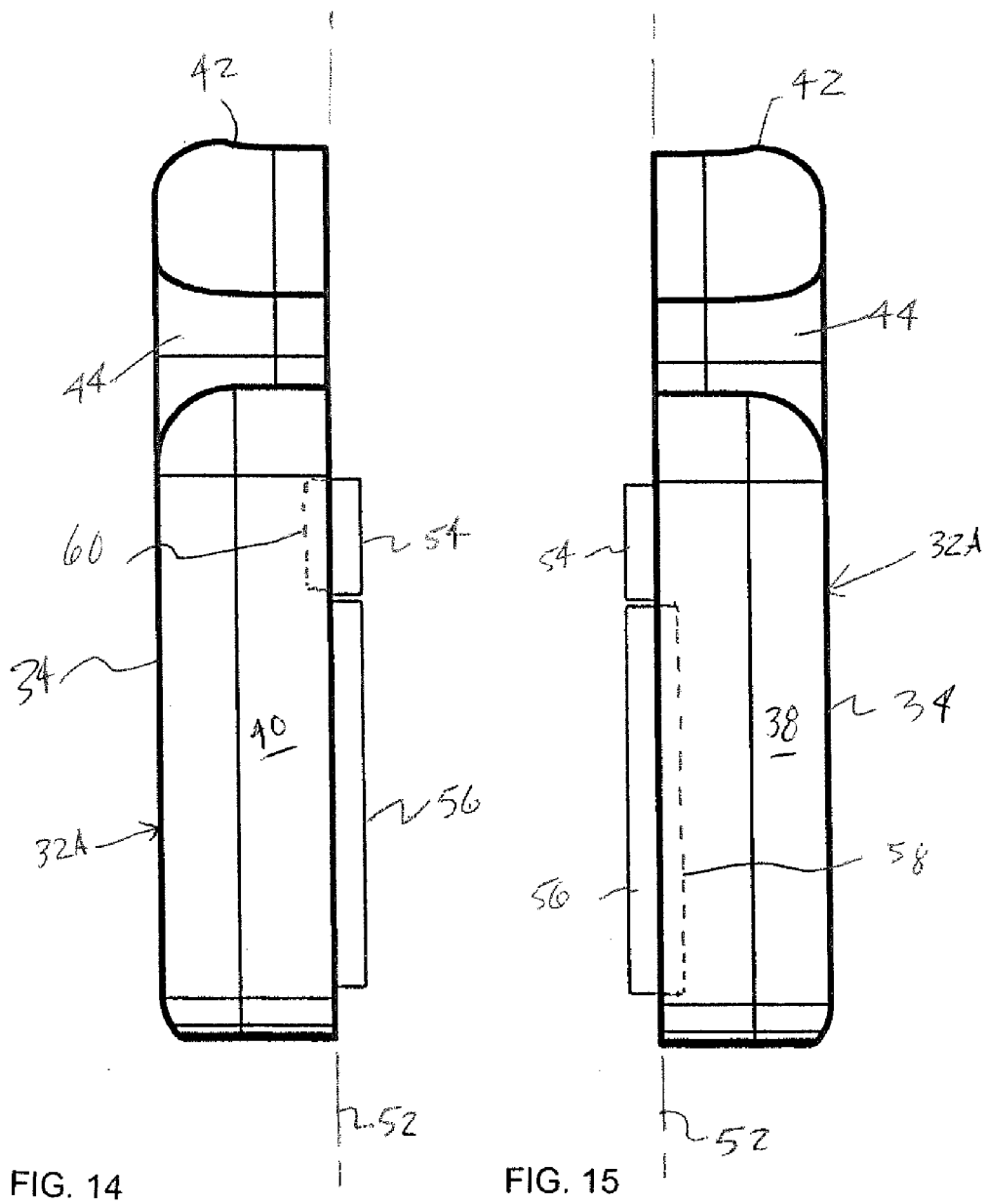
FIG. 14 is a left side elevational view of the first portion of the attachment member of FIGS. 11 to 13.
FIG. 15 is a right side elevational view of the first portion of the attachment member of FIGS. 11 to 14.

It should be understood that the appended drawings are not necessarily to scale, presenting a somewhat simplified representation of various preferred features illustrative of the basic principles of the invention. The specific design features of the protective devices as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the protective devices illustrated in the drawings. In general, up or upward generally refers to an upward direction within the plane of the paper in FIGS. 2 and 3 and down or downward generally refers to a downward direction within the plane of the paper in FIGS. 2 and 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the protective devices for electric power adapters/chargers disclosed herein. The following detailed discussion of various alternative and preferred embodiments will illustrate the general principles of the invention with regard to a particular power adapter/charger for portable electronic devices. Other embodiments suitable for other applications will be apparent to those skilled in the art given the benefit of this disclosure.

Referring now to the drawings, FIGS. 1 and 2 show a protective device 10 installed on an electric alternating current (AC) to direct current (DC) power adapter or charger 12 according to a first embodiment of the present invention. The illustrated power adapter/charger 12 is of the type for charging and/or powering a portable electronic device or the like.

As best shown in FIG. 3, the exemplary electric power adapter/charger 12 is for a laptop computer, but it is noted that the electric power adapter/charger 12 can be of any other suitable type. The illustrated electric power adapter/charger 12 is an 85 W MagSafe Power adapter for use with a 15 inch or a 17 inch MacBook Pro laptop computer and is available from Apple Inc., of Cupertino, Calif. The illustrated electric power adapter/charger 12 has a square-shaped base or body 14, sometimes referred to as a "power brick", containing components for converting electric alternating current (AC) to electric direct current (DC). Retractable prongs 16 for insertion into a mains power wall outlet are located at a bottom of the body 14. An electric wire or cable 18 for connection to the portable electronic device, to deliver DC power to the portable electronic, extends from a central location on a top 20 of the square-shaped body 14 opposite the prongs 16. The illustrated electric power adapter/charger 12 also includes a pair of retractable arms or wings 22 located on opposed lateral sides 24 of the body 14 that, when extended, form a cable wrap about the location in which the electric cable 18 extends from the body 14 so that the electric cable 18 can be selectively wrapped about the wings 22 for storage and/or travel when the electric power adapter/charger 12 is not is use.

As best shown in FIGS. 1 and 2, the illustrated protective device 10 includes a trumpet-shaped support member 26 having an inner passage 28 therethrough along a longitudinal axis 30 configured to receive the electric cable 18 of the electric power adapter/charger 12 within the inner passage 28 with a first end of the inner passage 28 facing the body 14 of the electric power adapter/charger 12 to support the electric cable 18 of the adapter/charger 12 adjacent the body 14 of the electric power adapter/charger 12 to prevent bending of the electric cable 18 at sharp angles near the body 14 of the electric power adapter/charger 12. The illustrated protective device 10 also includes an attachment member 32 configured to be removably secured to the body 14 of the electric power adapter/charger 12 and secured to the trumpet-shaped support member 26 to secure the trumpet-shaped support member 26 to the electric power adapter 12.

As best shown in FIGS. 4 to 10, the illustrated attachment member 32 is a generally square-shaped enclosure configured to closely conform to the body 14 of the electric power adapter/charger 12 and substantially enclose the body 14 of the electric power adapter/charger 12. The illustrated attachment member 32 has spaced-apart and vertically extending front and rear walls 34, 36, a pair of spaced-apart and vertically extending lateral side walls 38, 40 connecting lateral edges of the front and rear walls 34, 36, and a generally horizontally extending top wall 42 connecting top edges of the front and back walls 34, 36 and the top edges of the lateral side walls 38, 40 to form a hollow interior space. It is noted, however, that the attachment member 32 can alternatively have any other suitable configuration. The illustrated attachment member 32 encloses substantially all of the body 14 of the electric power adapter/charger 12 except a lower end portion thereof so that the electric prongs 16 can be selectively extended and retracted. The upper end portion of the illustrated attachment member 32 is configured to closely conform to the electric power adapter 12 with the wings 22 in an extended position. Thus, the illustrated attachment member 32 has a pair of opposed indentations 44 formed in the lateral side walls 38, 40 to form a cable wrap 46 near an upper end of the attachment member 32. When the electric power adapter/charger 12 is located within the illustrated attachment member 32 with the wings 22 in an extended position, the wings 22 prevent the body 14 of the electric power adapter/charger 12 from sliding out of the attachment member 32 through the open bottom end of the attachment member 32. When the electric power adapter/charger 12 is located within the illustrated attachment member 32 with the wings 22 in a retracted position, the body 14 of the electric power adapter/charger 12 can slide into and out of the attachment member 32 through the open bottom end of the attachment member 32. The top wall 42 of the illustrated attachment member 32 is provided with a centrally located top opening 48 sized and shaped for cooperating with the trumpet-shaped support member 26 as described in more detail hereinbelow. The illustrated top opening 48 is oblong shaped, that is, rectangular with rounded corners, but it is noted that the top opening 48 can alternatively have any other suitable shape. The illustrated top opening 48 is also provided with a counter bore 50 at its outer edge to form a reduced thickness at the edge forming the top opening 48 so that the trumpet-shaped support member 26 is substantially flush with the upper outer surface of the top wall 48.

The illustrated attachment member 32 is molded of a plastic material or the like. It is noted, however, that any other suitable method of manufacturing can alternatively be utilized and/or any other suitable material can alternatively be utilized.

The illustrated attachment member 32 includes a first or front portion 32A and a second or rear portion 32B that are separate components that can be selectively secured together about the body 14 of the electric power adapter/charger 12 or selectively separated to remove the electric power adapter/charger 12 from the attachment member 32. The illustrated first and second portions 32A, 32B are sized and shaped to each form half of the illustrated attachment member 32 about a vertically oriented and forward-rearward facing parting plane 52 centrally located in the forward-rearward direction. The illustrated first and second portions 32A, 32B are identical but facing in opposite directions. This construction enables two of the same components to be used to reduce manufacturing costs. It is noted, however, that the first and second portions 32A, 32B can alternatively have any other suitable configuration such as, for example, a central and laterally facing parting plane, non-identical components, and the like.

FIGS. 11 to 15 illustrate the first portion 32A of the illustrated attachment member 32, but it is noted that the second portion 32B of the illustrated attachment member 32 is identical or the same. The illustrated first portion 32A is configured to interlock with the second portion 32B to removably secure the first and second portions 32A, 32B together. The illustrated first member 32A has a tab 54, 56 and a socket 58, 60 along each of the lateral side walls 38, 40 of the attachment member 32. The illustrated tabs 54, 56 and sockets 58, 60 are each rearward facing to cooperate with forward facing tabs and sockets of the second portion 32B. The illustrated tabs 54, 56 and sockets 58, 60 each have a thickness of about one-half of the thickness of the lateral side walls 38, 40 of the attachment member 32 and are located at the inner side of the lateral side walls 38, 40 so that the tabs 54, 56 and sockets 58, 60 are not visible when the first and second portions 32A, 32B are secured together. The illustrated tabs 54, 46 and sockets 58, 60, are sized and shaped so that the tabs 54, 56 are retained within the sockets 58, 60 with a friction fit unless a suitable withdrawal force is applied to withdraw the tabs 54, 56 from the sockets 58, 60. The illustrated first portion 32A has a first socket 58 located below a contiguous first tab 54 on the lateral side wall 38 forming the right-side and a second socket 60 located above a contiguous second tab 56 on the lateral side wall 40 forming the left-side. The illustrated first tab 54 is sized smaller than the first socket 58 and sized to cooperate with the second socket 60 and the illustrated second tab 56 is sized larger than the second socket 60 and sized to cooperate with the first socket 58. Configured in this manner, the tabs 54, 56 and the sockets 58, 60 of the first portion 32A cooperate with the tabs and the sockets of the second portion 32B to removable secure the first portion 32A to the second portion 32B. It is noted that the tabs 54, 56 and sockets 58, 60 can alternatively have any other suitable quantity, size, shape, and/or location. It is also noted that the first and second portions 32A, 32B can alternatively be removably secured together in any other suitable manner.

As best shown in FIGS. 4 to 10, the illustrated trumpet-shaped support member 26 has a trumpet-shaped inner passage 28 extending therethrough along the vertically-extending longitudinal axis 30 from an inlet at a lower end 62 to an outlet at an upper end 64. The term "trumpet-shaped" is used herein and in the claims to mean having a first end smaller than a second end with a smooth transition therebetween. The illustrated inner passage 28 is configured to receive the electric cable 18 of the electric power adapter/charger 12 therein. The lower end 62 of the illustrated inner passage 28 is sized and shaped to closely receive and conform to the electrical wire 18 of the electric power adapter/charger 12. The bottom edge of the illustrated inner passage 28 is rounded to closely conform to the electrical cable 18 of the illustrated electrical power adapter/charger 12. The illustrated lower end 62 of the inner passage 28 is circular shaped but any other suitable shape can alternatively be utilized depending on the particular electric power adapter/charger 12 to be used. The upper end 64 of the illustrated inner passage 28 is sized and shaped to allow the electrical wire 18 of the electric power adapter/charger 12 to partially bend without reaching a sharp bend. The illustrated upper end 64 of the inner passage 28 is oblong shaped, that is a rectangle with rounded corners, but any other suitable shape can alternatively be utilized depending on the amount of bend to be permitted. It is noted that the inner passage 28 can have any other suitable shape. The illustrated inner passage 28 is arcuate between the lower end 62 and the upper end 64 to provide a smooth transition therebetween. The outer surface of the illustrated support member 26 is also trumpet-shaped but any other suitable shape can alternatively be utilized. The upper end of the outer surface of the illustrated support member 26 is provided with horizontally extending and vertically spaced-apart upper and lower flanges 66, 68. The illustrated upper and lower flanges 66, 68 are configured to receive the edge of the top opening 48 in the top wall 42 of the attachment member 32 to secure the support member 26 to the attachment member 32. The illustrated support member 26 is sized and shaped so that the upper end of the support member 26 is substantially flush with the outer surface of the top wall 42 of the attachment member 32 when secured within the top opening 48 of the attachment member 32.

The illustrated support member 26 is molded of a plastic material or the like. It is noted however that any other suitable method of manufacturing can alternatively be utilized and/or any other suitable material can alternatively be utilized. The support member 26 can comprise the same material as the attachment member 32.

The illustrated support member 26 includes a first or front portion 26A and a second or rear portion 26B that are separate components that can be selectively secured together about the electric cable 18 of the electric power adapter/charger 12 or selectively separated to remove the electric power adapter/charger 12. The illustrated first and second portions 26A, 26B are sized and shaped to each form half of the illustrated support member 26 about a vertically oriented and forward-rearward facing parting plane 70 centrally located in the forward-rearward direction. The illustrated first and second portions 26A, 26B are identical but facing in opposite directions. This construction enables two of the same components to be used to reduce manufacturing costs. Thus, the parting planes 52, 70 of the illustrated attachment and support members 32, 26 are coplanar. It is noted, however, that the first and second portions 26A, 26B can alternatively have any other suitable configuration such as, for example, a central and laterally facing parting plane, non-identical components, and the like.

FIGS. 16 to 19 illustrate the first portion 26A of the illustrated support member 26, but it is noted that the second portion 26B of the illustrated support member 26 is identical or the same. The illustrated first portion 26A is configured to interlock with the second portion 26B to removably secure the first and second portions 26A, 26B together. The illustrated first member 26A has a tab 72 and a socket 74 along opposite lateral sides of the inner passage 28. The illustrated tab 72 and socket 74 are each rearward facing to cooperate with a forward facing tab and socket of the second portion 26B. The illustrated tabs 72 and sockets 74 are sized and shaped so that the tabs 72 are retained within the sockets 74 with a friction fit unless a suitable withdrawal force is applied to withdraw the tabs 72 from the sockets 74. Configured in this manner, the tab 72 and socket 74 of the first portion 26A cooperate with the tab and socket of the second portion 26B to removable secure the first portion 26A to the second portion 26B. It is noted that the tabs 72 and sockets 74 can alternatively have any other suitable quantity, size, shape, and/or location. It is also noted that the first and second portions 26A, 26B can alternatively be removably secured together in any other suitable manner.

The illustrated first and second support members 26A, 26B are also provided with engagement legs or posts 90. The opposed engagement legs or posts 90 are configured to engage the attachment member 32 to ensure that the first and second portions 26A, 26B of the support member 26 are secured together during installation and remain secured together during use. The illustrated engagement posts 90 outwardly and horizontally extend from the outer surface of the support member 26 near the lower ends of the first and second support members 26A, 26B in the forward and rearward directions respectively. The illustrated engagement posts 90 have lengths sized so that the free outer ends of the engagements posts form abutments 92 that engage the inner surfaces of the first and second portions 32A, 32B of the attachment member 32 when the first and second portions 32A, 32B of the attachment member 32 are secured together to prevent outward movement of the lower ends of the support member 26 so that the free lower ends of the first and second portions 26A, 26B of the support member 26 do not undesirably separate. The illustrated engagement posts 90 are elongate and cylindrical shaped but it is noted that the engagement posts 90 can alternatively have any other suitable configuration. While the illustrated engagement posts are formed integral with the first and second portions 26A, 26B of the support member 26, it is noted that the engagement posts 90 can alternatively be formed integral with the first and second portions 32A, 32B of the attachment member 32.

The illustrated protective device 10 can be installed onto the electric power adapter/charger 12 in the following manner. With the first and second portions 32A, 32B of the attachment members 32 separated and the first and second portions 26A, 26B of the support member 26 separated, the first or front portion 26B of the support member 26 is inserted into the top opening 48 of the first or front portion 32B of the attachment member 32 with the edge of the top wall 42 of the first portion 32B of the attachment member 32 extending between the upper and lower flanges 66, 68 of the first portion 26B of the support member 26. Also, the second or rear portion 26B of the support member 26 is inserted into the top opening 48 of the second or rear portion 32B of the attachment member 32 with the edge of the top wall 42 of the second portion 32B of the attachment member 32 extending between the upper and lower flanges 66, 68 of the second portion 26B of the support member 26. With the wings 22 of the electric power adapter/charger 12 in their extended positions, the electric power adapter/charger 12 is placed into the second portion 32B of the attachment portion 32 with the wings 22 located in the upper portion, above the indentations 44, of the second portion 32B of the attachment portion 32 above and the electric cable 18 extending upwardly through the inner passage 28 of the second portion 26B of the support member 26. Inserted in this manner, the lower end of the illustrated second portion 26B of the support member 26 faces the top 20 of the body 14 of the electric power adapter/charger 12 and engages the top 20 of the body 14 of the electric power adapter/charger 12 and relative movement between the second portion 32B of the attachment member 32 and the body 14 of the electric power adapter/charger 12 is substantially prevented by the close fit therebetween. The first or front portion 32A of the attachment member 32 is then inserted over the second or rear portion 32A of the attachment member 32 with the electric power adapter/charger 12 therein until the first and second portions 26A, 26B of the support member 26 engage and are interlocked to secure the first and second portions 26A, 26B together about the electric cable 18 and the first and second portions 32A, 32B of the attachment member 32 engage and are interlocked to secure the first and second portions 32A, 32B of the attachment member 23 together about the body 14 of the electric power adapter/charger 12. Secured in this manner, the electric cable 18 can be selectively wound onto the cable wrap 46 formed by the attachment member 32 and sharp bending of the electric cable 18 near the body 14 of the electric power adapter/charger 12 is prevented by the trumpet-shaped support member 26. To remove the protective device 10 from the electric power adapter/charger 12, the above described process is reversed.

Figure 20:
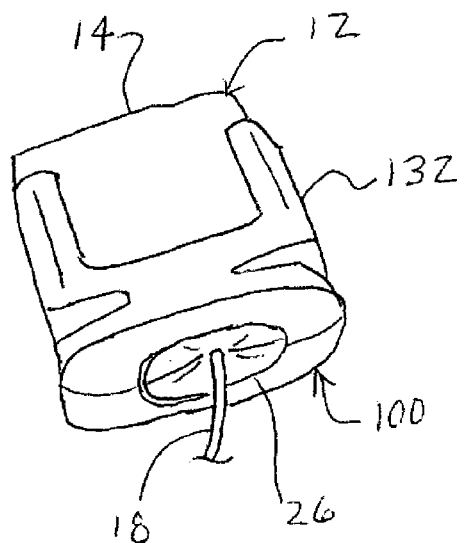
FIG. 20 is a front-top perspective view of a protective device attached onto an electric power adapter or charger according to a second embodiment of the present invention.
Figure 21:
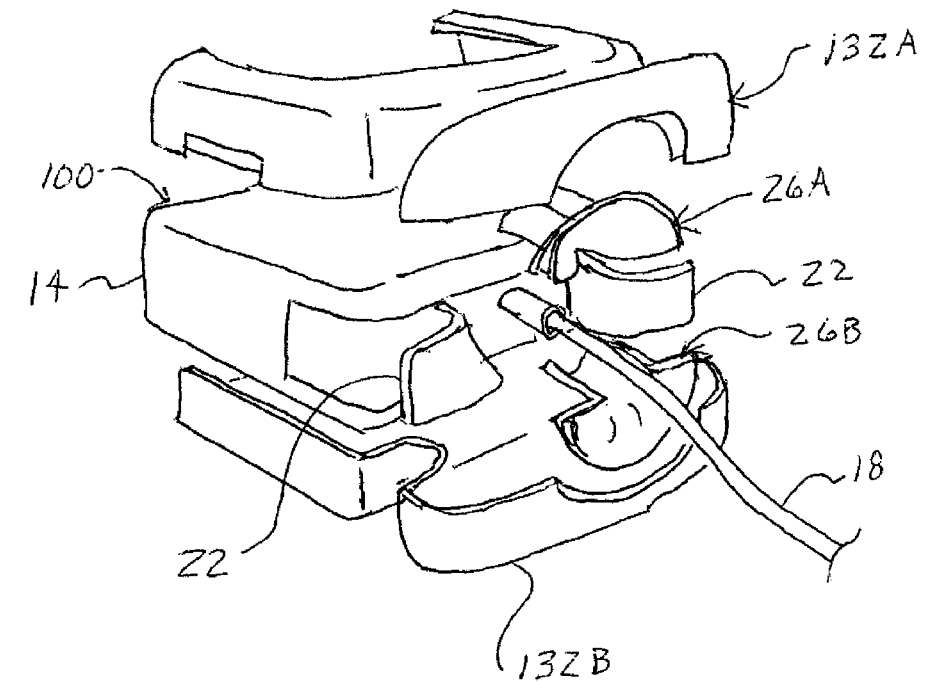
FIG. 21 is a left side-top exploded perspective view of the protective device and the electric power adapter or charger of FIG. 20.
Figure 22:
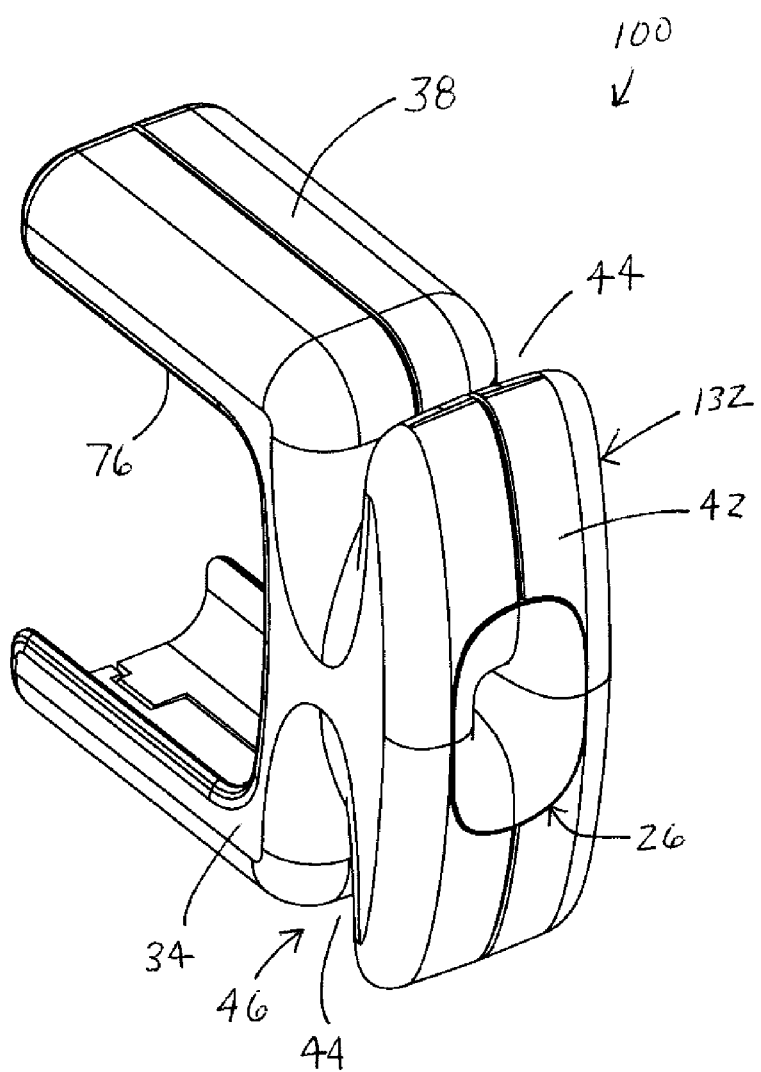
FIG. 22 is a top-front perspective view of the protective device of FIGS. 20 and 21 with the electric power adapter or charger removed.
Figure 23:
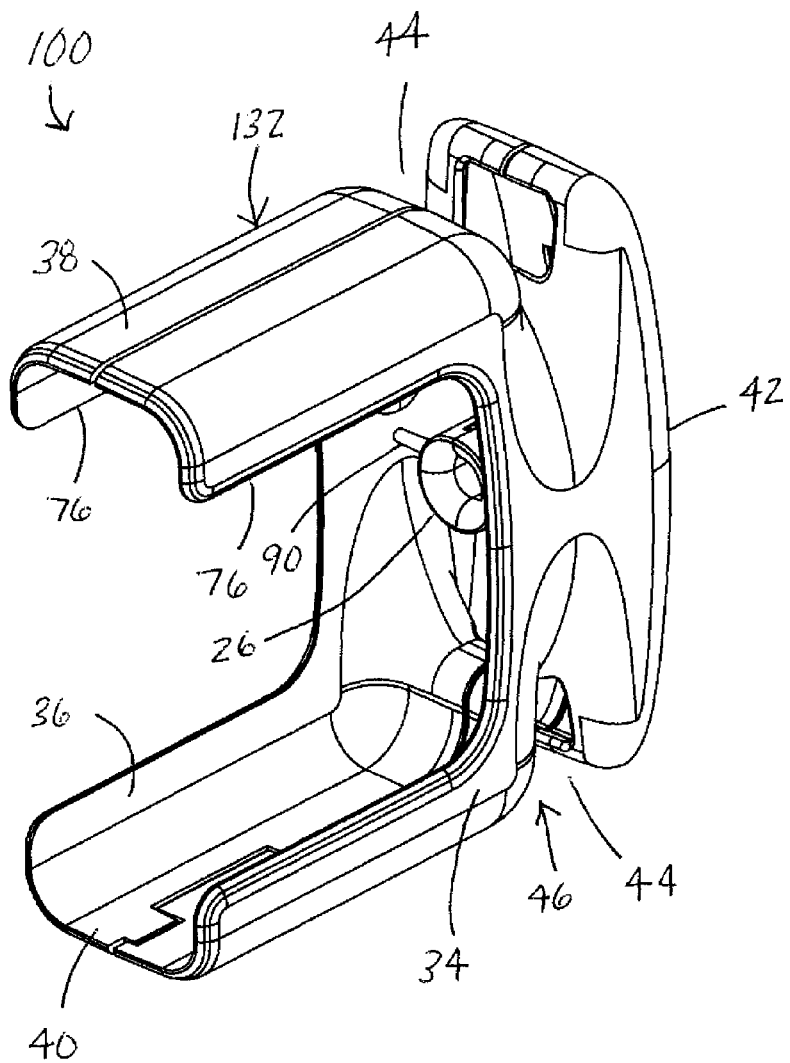
FIG. 23 is a bottom-front perspective view of the protective device of FIG. 22.
Figure 25:
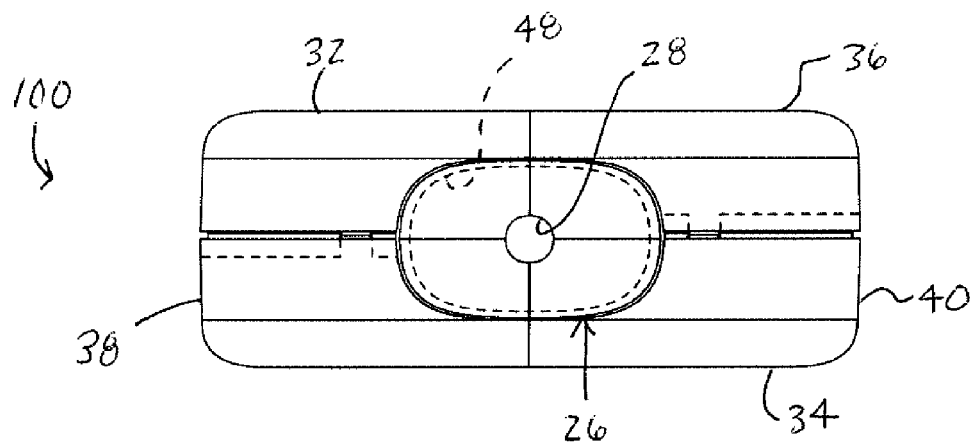
FIG. 25 is a top plan view of the protective device of FIGS. 22 to 24.
Figure 24:
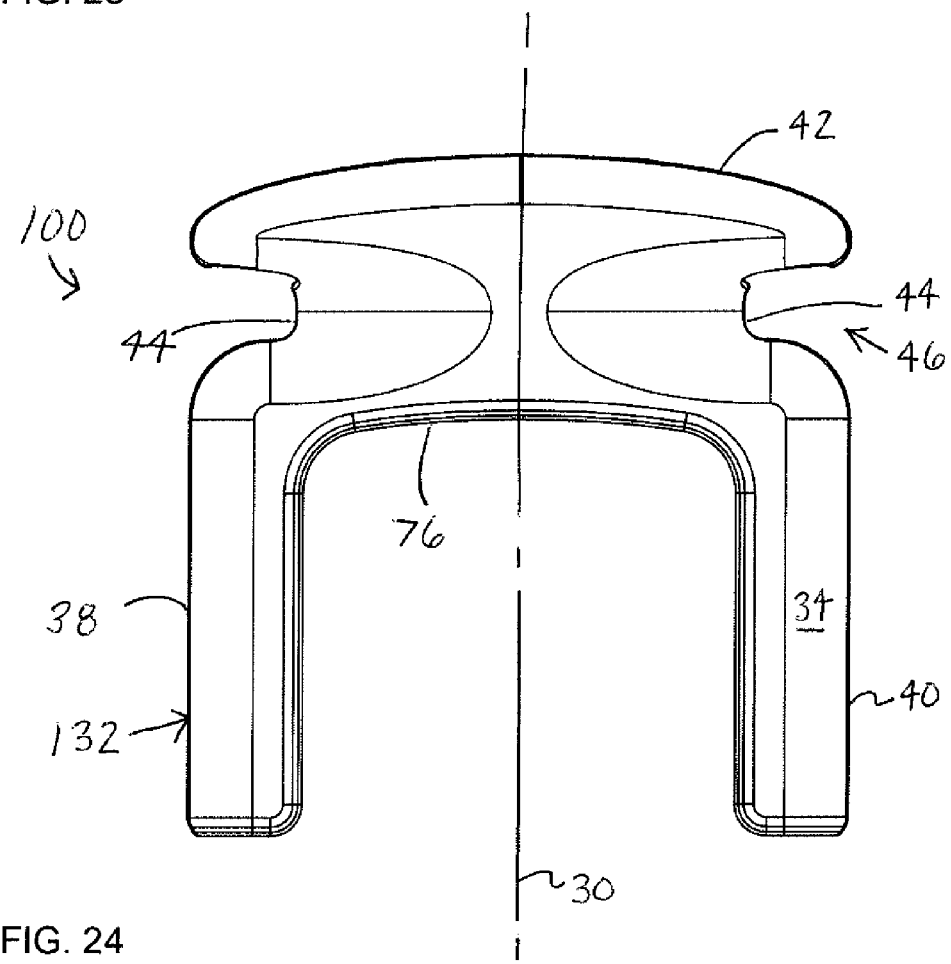
FIG. 24 is a front elevational view of the protective device of FIGS. 22 and 23.
Figure 29:
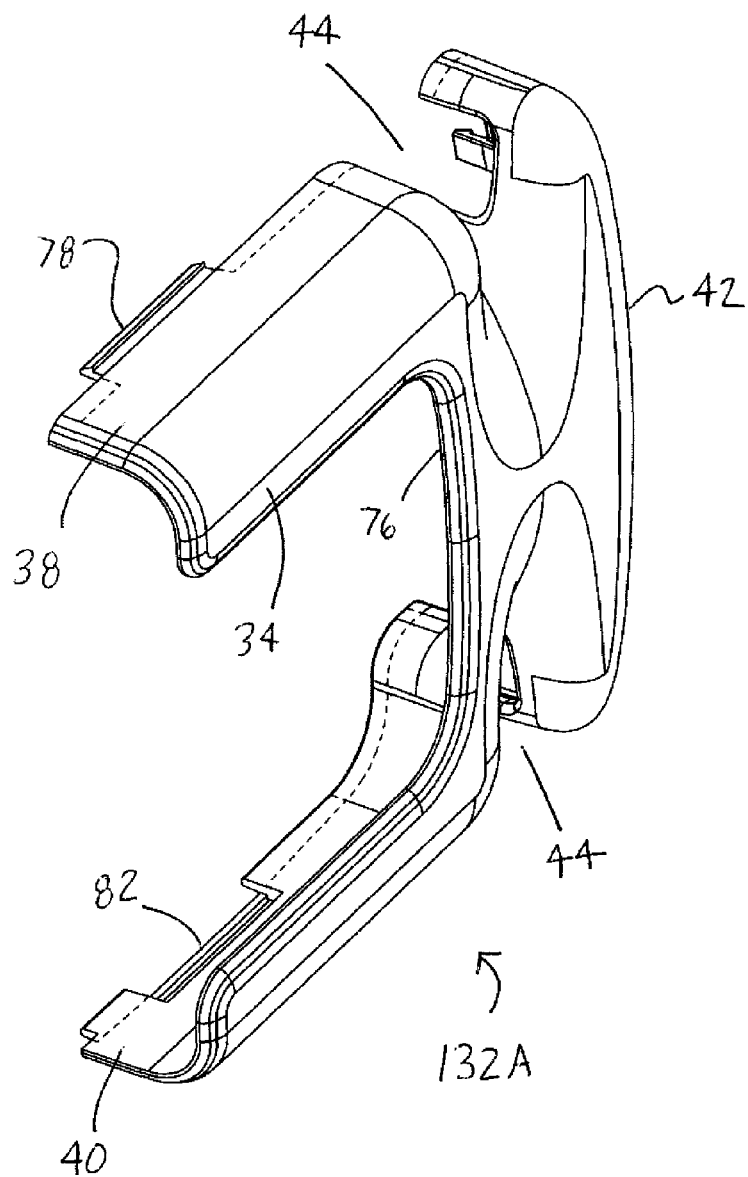
FIG. 29 is a bottom-front perspective view of a first or front portion of an attachment member of the protective device of FIGS. 22 to 28, wherein a second or rear portion of the attachment member is identical.
Figure 31:
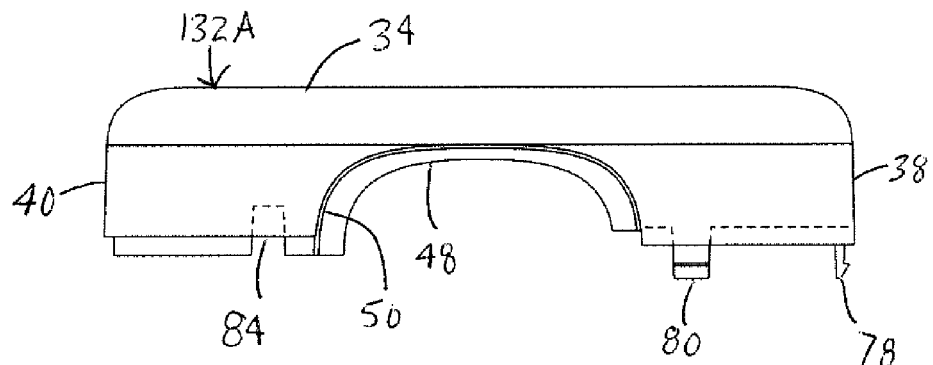
FIG. 31 is a top plan view of the first portion of the attachment member of FIGS. 29 and 30.
Figure 30:
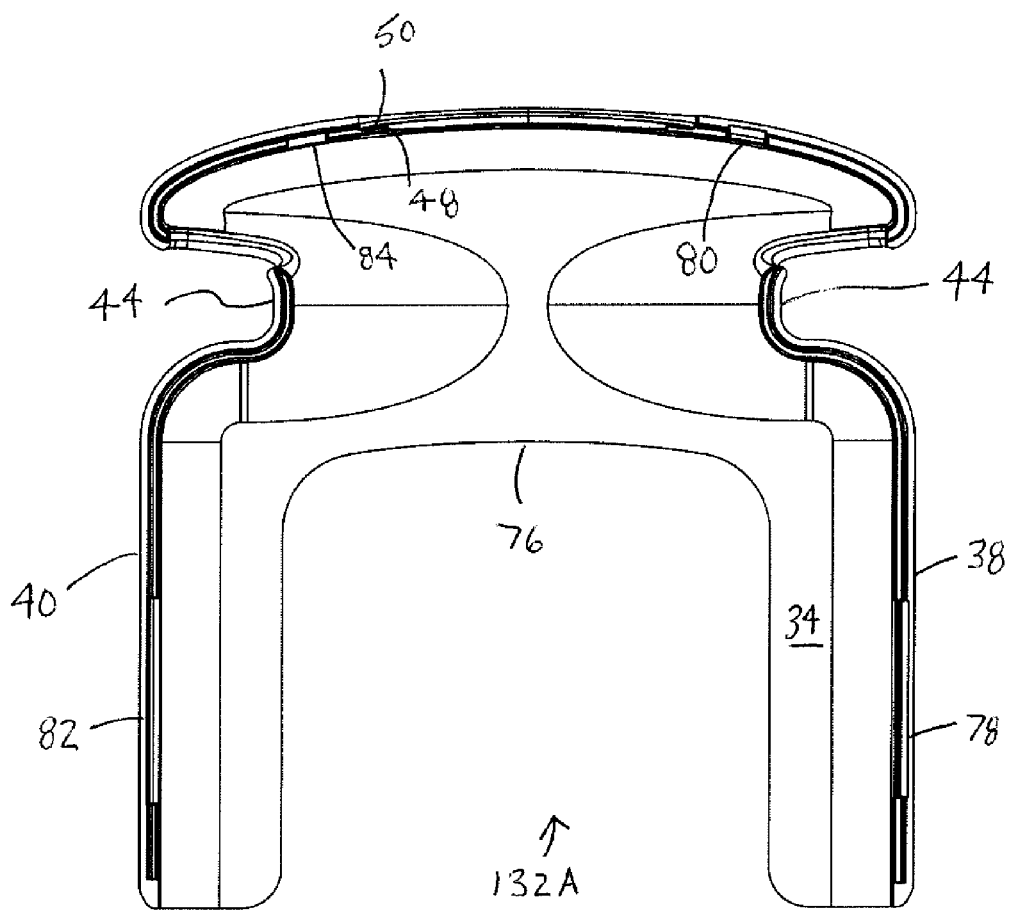
FIG. 30 is a rear elevational view of the first portion of the attachment member of FIG. 29.
Figure 34:
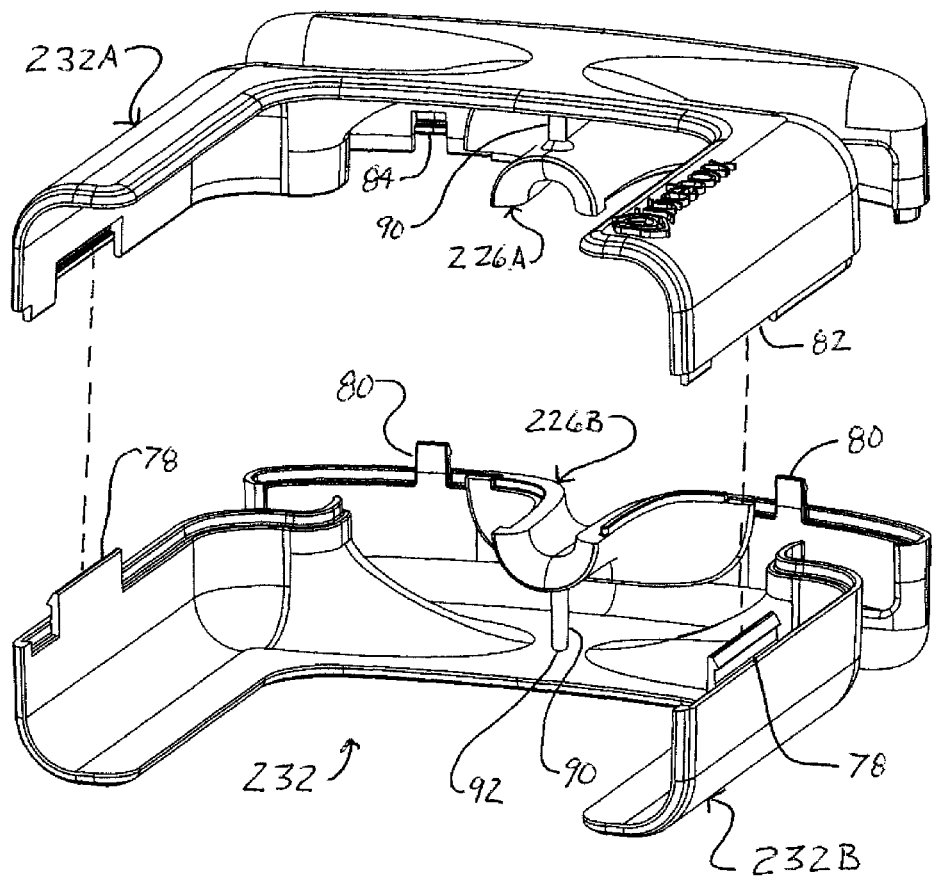
FIG. 34 is a front-bottom perspective view of a protective device a according to a third embodiment of the present invention.
Figure 35:
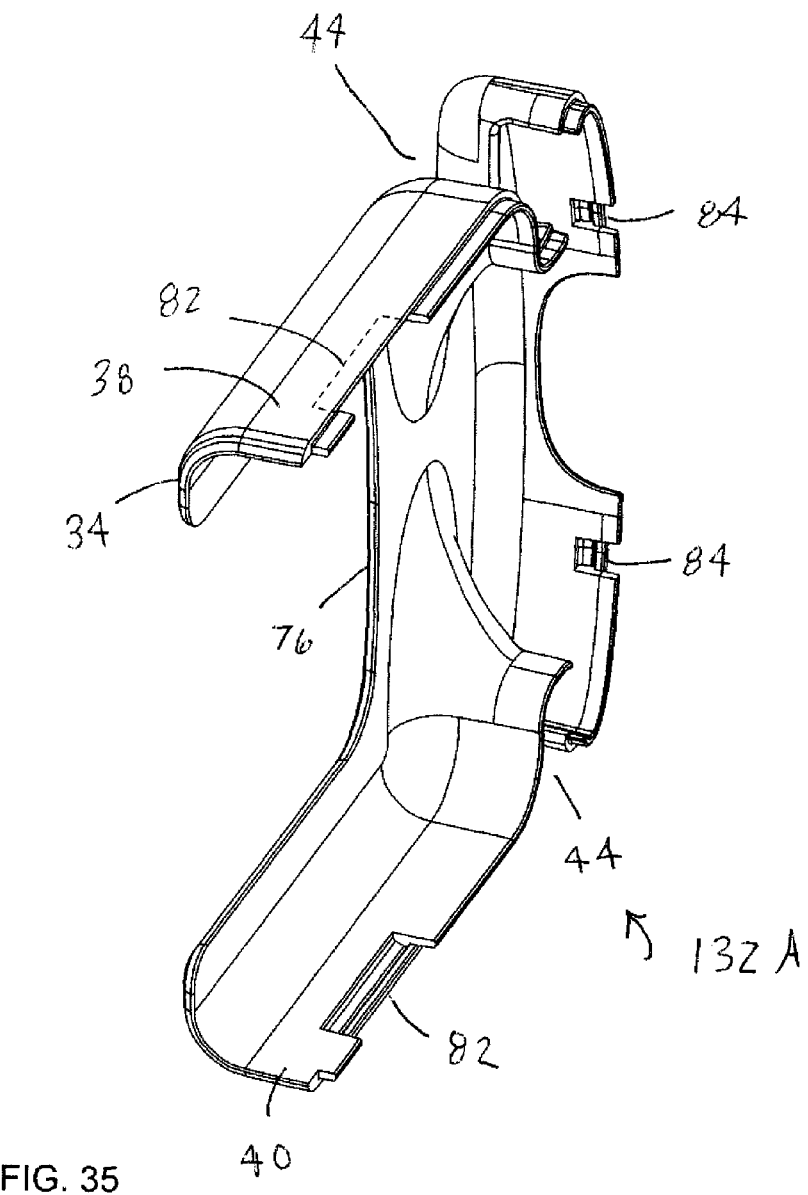
FIG. 35 is a is a bottom-front perspective view of a first or front portion of an attachment member of the protective device of FIG. 34 that has all sockets, wherein a second or rear portion of the attachment member is substantially the same but has all tabs that cooperate with the sockets of the front portion.
Figure 37:
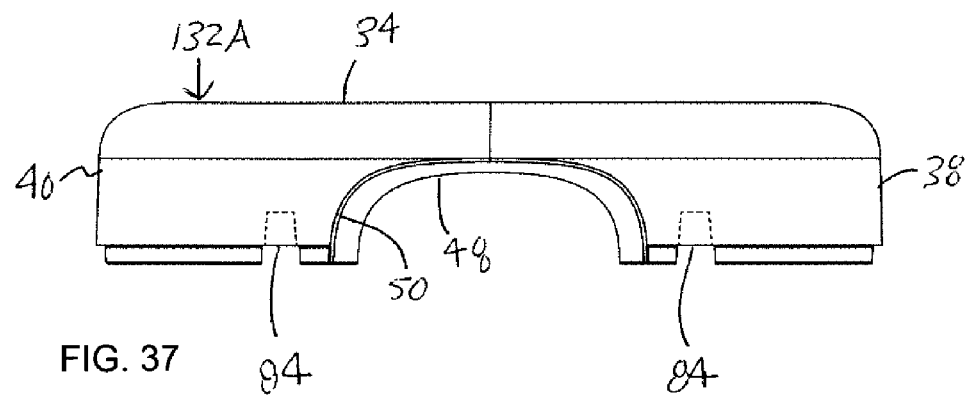
FIG. 37 is a top plan view of the first portion of the attachment member of FIGS. 35 and 36.
Figure 36:
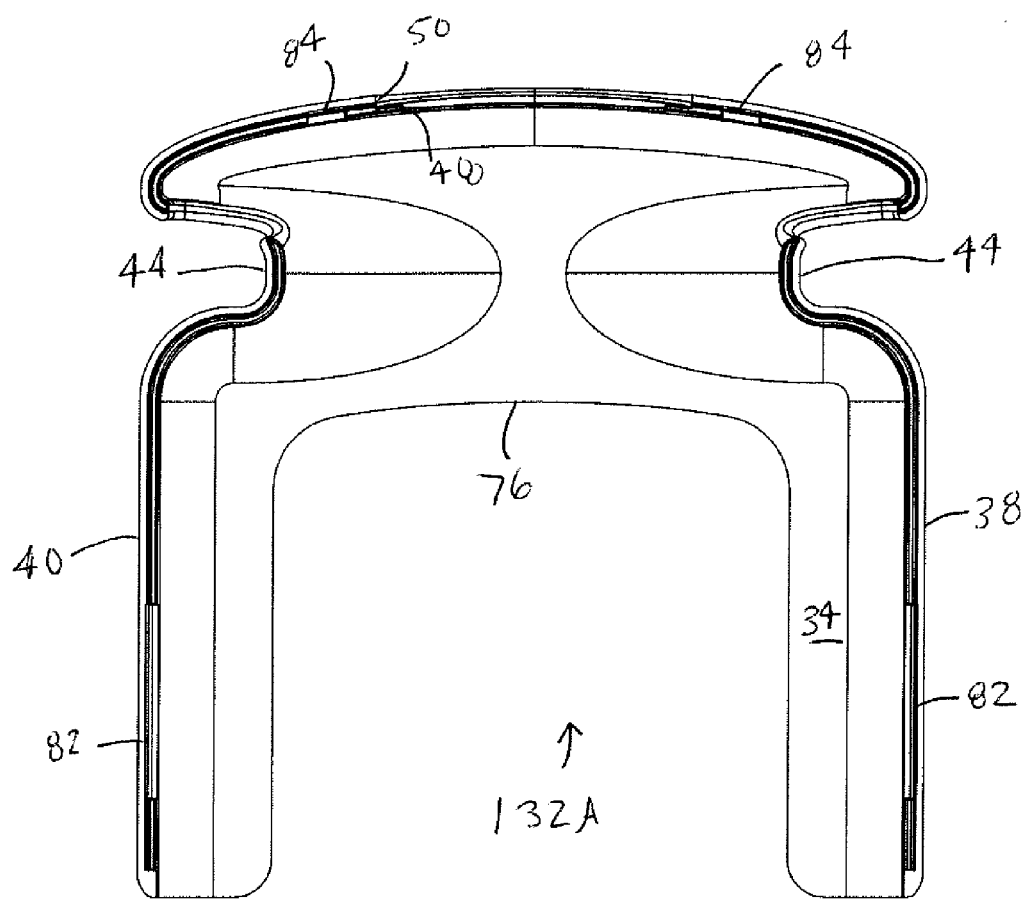
FIG. 36 is a rear elevational view of the first portion of the attachment member of FIG. 35.

FIGS. 20 and 21 show a protective device 100 installed on an electric alternating current (AC) to direct current (DC) power adapter or charger 12 according to a second embodiment of the present invention. The protective device 100 of the second embodiment is substantially the same as the protective device 10 according to the first embodiment except that attachment member 132 has a different shape and the first and second portions 132A, 132B of the attachment member 132 have a different interconnection.

As best shown in FIGS. 22 to 28, the illustrated attachment member 132 has slots or openings 76 formed in the front and rear walls 34, 36 of the attachment member 132. The illustrated openings 76 are square-shaped and open into the bottom edge of the front and rear walls 34, 36 of the attachment member 132 so that the front and rear walls 34, 36 are generally downward-facing U-shaped. Formed in this manner, the front and rear sides of the electric power adapter/charger 12 are substantially uncovered by the attachment member 132 to reduce the amount of heat generated by the electric power adapter/charger 12 that is retained within the attachment member 132. It is noted that any other suitable size, shape and/or quantity of openings 76 can be utilized in the attachment member 132.

FIGS. 29 to 33 illustrate the first portion 132A of the illustrated attachment member 132, but it is noted that the second portion 132B of the illustrated attachment member 132 is identical or the same. The illustrated first portion 132A is configured to interlock with the second portion 132B to removably secure the first and second portions 132A 132B together. The illustrated first member 132A has tabs 78, 80 and sockets 82, 84 at the lateral side walls 38, 40 and the top wall 42 on opposite sides of the top opening 48. The illustrated tabs 78, 80 and sockets 82, 84 are each rearward facing to cooperate with forward facing tabs and sockets of the second portion 132B. The illustrated tabs 78, 80 and sockets 82, 84 each have a thickness of about one-half of the thickness of the lateral side walls 38, 40 the top wall 42 of the attachment member 132 and are located at the inner side of the walls 38, 40, 42 so that the tabs 78, 80 and sockets 82, 84 are not visible when the first and second portions 132A, 132B are secured together. As best shown in FIGS. 32A and 33A, the illustrated tabs 78, 80 and sockets 82, 84 are configured with a removable snap-lock connection. The illustrated tabs 78, 80 each have a hook 86 that resiliently deforms to snap behind an abutment 88 formed in the sockets 82, 84 when the tabs 78, 80 and sockets 82, 84 are brought together to form an interconnection therebetween. The illustrated hook 86 can also be resiliently deformed to snap out from behind the abutment 88 when desired. The illustrated first portion 132A has a first tab 78 located near the bottom of the lateral side wall 38 forming the right-side and a first socket 82 located near the bottom of the lateral side wall 40 forming the left-side. The illustrated first portion 132A also has a second tab 80 located near the right side of the top opening 48 in the top wall 42 and a second socket 84 located near the left side of top opening 48 in the top wall 42. The illustrated first tab 78 is sized and shaped to cooperate with the first socket of the second portion 132B and the illustrated second tab 80 is sized and shaped to cooperate with the second socket of the second portion 132B. The illustrated first socket 82 is sized and shaped to cooperate with the first tab of the second portion 132B and the illustrated second socket 84 is sized and shaped to cooperate with the second tab of the second portion 132B. Configured in this manner, the tabs 78, 80 and the sockets 82, 84 of the first portion 132A cooperate with the tabs and the sockets of the second portion 132B to removable secure the first portion 132A to the second portion 132B. It is noted that the tabs 78, 80 and the sockets 82, 84 can alternatively have any other suitable quantity, size, shape, and/or location. It is also noted that the first and second portions 132A, 132B can alternatively be removably secured together in any other suitable manner.

The remaining edges of illustrated first member 132A, not having the tabs 78, 80 or the sockets 82, 84, are configured to overlap the edge of the second member 132B. The illustrated overlapping portions each have a thickness of about one-half of the thickness of the walls 38, 40, 42 of the attachment member 132 and are configured so that the overlap is not visible when the first and second portions 132A, 132B are secured together. The illustrated first member 132A is configured so that all edges of the top wall 42 and the lateral side wall 38 to the right of the top opening 48 are configured to form an outer portion of the overlap and all edges of the top wall 42 and lateral side wall 40 to the left of the top opening 42 are configured to form an outer portion of the overlap. It is noted that the overlap can alternatively have any other suitable quantity, size, shape, and/or location. It is also noted that the first and second portions 132A, 132B can alternatively be removably secured together in any other suitable manner.

FIGS. 34 to 37 shows a protective device 200 according to a third embodiment of the present invention. The protective device 200 of the third embodiment is substantially the same as the protective device 100 according to the second embodiment except that the first and second portions 232A, 232B of the attachment member 232 have a different interconnection.

The illustrated first and second portions 232A, 232B of the attachment member 232 interconnect to be selectively secured together and separated but are not identical like the first and second embodiments described above. The illustrated first or front portion 232A of the attachment member 232 is provided with none of the tabs 78, 80 but all of the sockets 82, 84 and the illustrated second or rear portion 232B of the attachment member 232 is provided with all the tabs 78, 80 but none of the sockets 82, 84. Thus, the illustrated first or front portion 232A of the attachment member 232 is a "female" portion having only the sockets 82, 84 and the illustrated second or rear portion 232B of the attachment member 232 is a "male" portion having only the tabs 78, 80. While manufacturing costs may be increased by providing the first and second portions 232A, 232B of the attachment member 232 with different configurations, the illustrated "male" and "female portions enable the parting line or interface between the first and second portions 232A, 232B of the attachment member 232 to have the same appearance on each side.

Any of the features or attributes of the above described embodiments and variations can be used in combination with any of the other features and attributes of the above described embodiments and variations as desired.

It is apparent from the above detailed description of preferred embodiments of the present invention, that the above-disclosed protective device can be easily installed onto and removed from the electric power adapter/charger. It is apparent that the above-disclosed protective device prevents the electric cable from sharply bending near the top of the body of the electric power adapter/charger.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A protective device for an electric power adapter having a body and a cable extending from the body, said protective device comprising, in combination:
   a trumpet-shaped support member having an inner passage therethrough along a longitudinal axis;
   wherein the inner passage has a first end and a second end larger than the first end;
   wherein the trumpet-shaped support member is configured to receive the cable of the electric power adapter within the inner passage with the first end of the inner passage facing the body of the electric power adapter to support the cable of the electric power adapter adjacent the body of the electric power adapter;
   wherein the trumpet-shaped support member includes first and second portions selectively connectable and separable about a parting plane containing the longitudinal axis so that the trumpet-shaped support member can be laterally connected and separated about the cable of the electric power adapter;
   an attachment member secured to the trumpet-shaped support member and configured to be removably secured to the body of the electric power adapter; and
   wherein the attachment member is configured to enclose at least a portion of the trumpet-shaped support member and at least a portion of the body of the electronic power adapter and the attachment member includes first and second portions selectively connectable and separable about a parting plane so that the attachment member can be laterally connected and separated about the at least a portion of the trumpet-shaped support member and the at least a portion of the electric power adapter.

2. The protective device according to claim 1, wherein the first and second portions of the trumpet-shaped support member are substantially identical.

3. The protective device according to claim 1, wherein the first and second portions of the attachment member clamp the trumpet-shaped support member.

4. The protective device according to claim 1, wherein the first and second portions of the attachment member are substantially identical.

5. The protective device according to claim 1, wherein the parting plane of the first and second portions of the attachment member is coplanar with the parting plane of the first and second portions of the trumpet-shaped support member.

6. The protective device according to claim 1, wherein the trumpet-shaped support member has a pair of spaced-apart flanges for receiving a wall of the attachment member to secure the trumpet-shaped support member to the attachment member.

7. A protective device for an electric power adapter having a body and a cable extending from the body, said protective device comprising, in combination:
   a support member having an inner passage therethrough along a longitudinal axis;
   wherein the inner passage has a first end and a second end larger than the first end;
   wherein the support member includes first and second portions selectively connectable and separable about a parting plane containing the longitudinal axis so that the support member can be laterally connected and separated about the cable of the electric power adapter;
   wherein the support member is configured to receive the cable of the electric power adapter within the inner passage with the first end of the inner passage facing the body of the electric power adapter to support the cable of the electric power adapter adjacent the body of the electric power adapter;

an attachment member secured to the support member and configured to be removably secured to the body of the electric power adapter; and wherein the attachment member is configured to enclose at least a portion of the support member and at least a portion of the body of the electronic power adapter and the attachment member includes first and second portions selectively connectable and separable about a parting plane so that the attachment member can be laterally connected and separated about the at least a portion of the support member and the at least a portion of the electric power adapter.

8. The protective device according to claim 7, wherein inner passage of the support member is trumpet shaped.

9. The protective device according to claim 7, wherein the first and second portions of the support member are substantially identical.

10. The protective device according to claim 7, wherein the first and second portions of the attachment member clamp the support member therebetween to secure the first and second portions of the support member together.

11. The protective device according to claim 7, wherein the parting plane of the first and second portions of the attachment member are is coplanar with the parting plane of the first and second portions of the support member.

12. The protective device according to claim 7, wherein the first and second portions of the support member are substantially identical.

13. The protective device according to claim 7, wherein the support member has a pair of spaced-apart flanges for receiving a wall of the attachment member to secure the support member to the attachment member.

14. The protective device according to claim 7, wherein the attachment member has a pair of opposed indentations that form a cable wrap for the cable.

15. A protective device for an electric power adapter having a body and a cable extending from the body, said protective device comprising, in combination:

a support member having an inner passage therethrough along a longitudinal axis;

wherein the inner passage has a first end and a second end larger than the first end;

wherein the support member is configured to receive the cable of the electric power adapter within the inner passage with the first end of the inner passage facing the body of the electric power adapter to support the cable of the electric power adapter adjacent the body of the electric power adapter;

wherein the support member includes first and second portions selectively connectable and separable about a parting plane containing the longitudinal axis so that the support member can be laterally connected and separated about the cable of the electric power adapter;

an enclosure configured to enclose at least a portion of the support member and at least a portion of the body of the electronic power adapter to secure to the support member to the body of the electric power adapter; and wherein the enclosure includes first and second portions selectively connectable and separable to selectively clamp the support member therebetween to secure the first and second portions of the support member together about the cable of the electric power adapter; and wherein the first and second portions of the enclosure are selectively connectable and separable about a parting plane and wherein the parting plane of the first and second portions of the enclosure is coplanar with the parting plane of the first and second portions of the support member.

16. The protective device according to claim 15, wherein the first and second portions of the enclosure are substantially identical.

17. The protective device according to claim 15, wherein the support member is trumpet shaped.

18. The protective device according to claim 15, wherein the first and second portions of the support member are substantially identical.

19. The protective device according to claim 15, wherein the support member has a pair of spaced-apart flanges for receiving a wall of the enclosure to secure the support member to the enclosure.

20. The protective device according to claim 15, wherein the enclosure has a pair of opposed indentations that form a cable wrap for the cable.

* * * * *